US008315926B2

(12) United States Patent
Storr et al.

(10) Patent No.: US 8,315,926 B2
(45) Date of Patent: Nov. 20, 2012

(54) ARCHITECTURAL DESIGN FOR TAX DECLARATION APPLICATION SOFTWARE

(75) Inventors: Cornelia Storr, Karlsruhe (DE); Ute Ludwig, Frankfurt (DE); Martin Von Der Emde, Wiesloch (DE); Thomas Hoffmann, Roemerberg (DE); Yongbin He, Schriesheim (DE); Theo Zimmermann, Foster City, CA (US); Dietmar Nowotny, Dielheim (DE)

(73) Assignee: SAP AG, Walldorf (DE)

( * ) Notice: Subject to any disclaimer, the term of this patent is extended or adjusted under 35 U.S.C. 154(b) by 231 days.

(21) Appl. No.: 12/233,534

(22) Filed: Sep. 18, 2008

(65) Prior Publication Data

US 2010/0070391 A1   Mar. 18, 2010

(51) Int. Cl.
G07F 19/00   (2006.01)
(52) U.S. Cl. .................. 705/31; 705/19; 705/30
(58) Field of Classification Search ............... 705/31
See application file for complete search history.

(56) References Cited

U.S. PATENT DOCUMENTS

| | | | |
|---|---|---|---|
| 4,947,321 A * | 8/1990 | Spence et al. ............ 705/45 |
| 5,550,734 A * | 8/1996 | Tarter et al. ............ 705/2 |
| 5,560,005 A | 9/1996 | Hoover et al. |
| 5,586,312 A | 12/1996 | Johnson et al. |
| 5,632,022 A | 5/1997 | Warran et al. |
| 5,634,127 A | 5/1997 | Cloud et al. |
| 5,680,619 A | 10/1997 | Gudmundson et al. |
| 5,704,044 A * | 12/1997 | Tarter et al. ............ 705/4 |
| 5,710,917 A | 1/1998 | Musa et al. |
| 5,768,119 A | 6/1998 | Havekost et al. |
| 5,822,585 A | 10/1998 | Nobel et al. |
| 5,832,218 A | 11/1998 | Gibbs et al. |
| 5,848,291 A | 12/1998 | Milne et al. |
| 5,867,495 A | 2/1999 | Elliott et al. |
| 5,881,230 A | 3/1999 | Christensen et al. |
| 5,893,106 A | 4/1999 | Brobst et al. |
| 5,918,219 A | 6/1999 | Isherwood |
| 5,987,247 A | 11/1999 | Lau |
| H1830 H | 1/2000 | Petrimoulx et al. |
| 6,028,997 A | 2/2000 | Leymann et al. |
| 6,038,393 A | 3/2000 | Iyengar et al. |
| 6,049,838 A | 4/2000 | Miller et al. |
| 6,070,197 A | 5/2000 | Cobb et al. |

(Continued)

FOREIGN PATENT DOCUMENTS

WO   00/23874   4/2000

(Continued)

OTHER PUBLICATIONS

Anon,; "Sequenst Corp Bell Atlantic: Bell Atlantic Selects Sequent for Video-on-Demand Program; Sequent Moves to Sieze Opportunity in New Market"; Business Wire; Dec. 6, 1994.

(Continued)

Primary Examiner — F. Ryan Zeender
Assistant Examiner — Fateh M Obaid
(74) Attorney, Agent, or Firm — Fish & Richardson P.C.

(57) ABSTRACT

Methods, systems, and apparatus, including computer program products, for implementing a software architecture design for a software application implementing tax declaration. The application is structured as multiple process components interacting with each other through service interfaces, and multiple service interface operations, each being implemented for a respective process component. The process components include an Accounting process component, a Due Item Processing process component, and a Payment Processing process component.

19 Claims, 17 Drawing Sheets

U.S. PATENT DOCUMENTS

| | | | |
|---|---|---|---|
| 6,151,582 | A | 11/2000 | Huang et al. |
| 6,167,563 | A | 12/2000 | Fontana et al. |
| 6,167,564 | A | 12/2000 | Fontana et al. |
| 6,177,932 | B1 | 1/2001 | Galdes et al. |
| 6,182,133 | B1 | 1/2001 | Horvitz |
| 6,208,345 | B1 | 3/2001 | Sheard et al. |
| 6,237,136 | B1 | 5/2001 | Sadahiro |
| 6,272,672 | B1 | 8/2001 | Conway |
| 6,311,170 | B1 | 10/2001 | Embrey |
| 6,338,097 | B1 | 1/2002 | Krenzke et al. |
| 6,424,991 | B1 | 7/2002 | Gish |
| 6,434,740 | B1 | 8/2002 | Monday et al. |
| 6,442,748 | B1 | 8/2002 | Bowman-Amuah |
| 6,445,782 | B1 | 9/2002 | Elfe et al. |
| 6,446,045 | B1 | 9/2002 | Stone et al. |
| 6,446,092 | B1 | 9/2002 | Sutter |
| 6,473,794 | B1 | 10/2002 | Guheen et al. |
| 6,493,716 | B1 | 12/2002 | Azagury et al. |
| 6,571,220 | B1 | 5/2003 | Ogino et al. |
| 6,594,535 | B1 | 7/2003 | Costanza |
| 6,601,233 | B1 | 7/2003 | Underwood |
| 6,601,234 | B1 | 7/2003 | Bowman-Amuah |
| 6,606,744 | B1 | 8/2003 | Mikurak |
| 6,609,100 | B2 | 8/2003 | Smith et al. |
| 6,671,673 | B1 | 12/2003 | Baseman et al. |
| 6,678,882 | B1 | 1/2004 | Hurley et al. |
| 6,687,734 | B1 | 2/2004 | Sellink et al. |
| 6,691,151 | B1 | 2/2004 | Cheyer et al. |
| 6,721,783 | B1 | 4/2004 | Blossman et al. |
| 6,738,964 | B1 | 5/2004 | Zink et al. |
| 6,747,679 | B1 | 6/2004 | Finch et al. |
| 6,750,885 | B1 | 6/2004 | Finch et al. |
| 6,764,009 | B2 | 7/2004 | Melick et al. |
| 6,772,216 | B1 | 8/2004 | Ankireddipally et al. |
| 6,789,252 | B1 | 9/2004 | Burke et al. |
| 6,845,499 | B2 | 1/2005 | Srivastava et al. |
| 6,847,854 | B2 | 1/2005 | Discenzo |
| 6,859,931 | B1 | 2/2005 | Cheyer et al. |
| 6,889,197 | B2 | 5/2005 | Lidow |
| 6,889,375 | B1 | 5/2005 | Chan et al. |
| 6,895,438 | B1 | 5/2005 | Ulrich |
| 6,898,783 | B1 | 5/2005 | Gupta et al. |
| 6,904,399 | B2 | 6/2005 | Cooper et al. |
| 6,907,395 | B1 | 6/2005 | Hunt et al. |
| 6,954,736 | B2 | 10/2005 | Menninger et al. |
| 6,985,939 | B2 | 1/2006 | Fletcher et al. |
| 6,990,466 | B1 | 1/2006 | Hu |
| 7,003,474 | B2 | 2/2006 | Lidow |
| 7,031,998 | B2 | 4/2006 | Archbold |
| 7,043,448 | B2 | 5/2006 | Campbell |
| 7,047,518 | B2 | 5/2006 | Little et al. |
| 7,050,056 | B2 | 5/2006 | Meyringer |
| 7,050,873 | B1 | 5/2006 | Discenzo |
| 7,055,136 | B2 | 5/2006 | Dzoba et al. |
| 7,058,587 | B1 | 6/2006 | Horne |
| 7,069,536 | B2 | 6/2006 | Yaung |
| 7,072,855 | B1 | 7/2006 | Godlewski et al. |
| 7,076,766 | B2 | 7/2006 | Wirts et al. |
| 7,117,447 | B2 | 10/2006 | Cobb et al. |
| 7,120,597 | B1 | 10/2006 | Knudtzon et al. |
| 7,120,896 | B2 | 10/2006 | Budhiraja et al. |
| 7,131,069 | B1 | 10/2006 | Rush et al. |
| 7,155,403 | B2 | 12/2006 | Cirulli et al. |
| 7,155,409 | B1 | 12/2006 | Stroh |
| 7,181,694 | B2 | 2/2007 | Reiss et al. |
| 7,184,964 | B2 | 2/2007 | Wang |
| 7,191,740 | B2 | 3/2007 | Beringer et al. |
| 7,194,431 | B1 | 3/2007 | Land et al. |
| 7,197,740 | B2 | 3/2007 | Beringer et al. |
| 7,200,569 | B2 | 4/2007 | Gallagher et al. |
| 7,206,768 | B1 | 4/2007 | deGroeve et al. |
| 7,216,091 | B1 | 5/2007 | Blandina et al. |
| 7,219,107 | B2 | 5/2007 | Beringer |
| 7,222,786 | B2 | 5/2007 | Renz et al. |
| 7,225,240 | B1 | 5/2007 | Fox et al. |
| 7,249,044 | B2 | 7/2007 | Kumar et al. |
| 7,257,254 | B2 | 8/2007 | Tunney |
| 7,283,973 | B1 | 10/2007 | Loghmani et al. |
| 7,293,254 | B2 | 11/2007 | Bloesch et al. |
| 7,299,970 | B1 | 11/2007 | Ching |
| 7,315,830 | B1 | 1/2008 | Wirtz et al. |
| 7,322,024 | B2 | 1/2008 | Carlson et al. |
| 7,324,966 | B2 | 1/2008 | Scheer |
| 7,353,180 | B1 | 4/2008 | Silverstone et al. |
| 7,356,492 | B2 | 4/2008 | Hazi et al. |
| 7,367,011 | B2 | 4/2008 | Ramsey et al. |
| 7,370,315 | B1 | 5/2008 | Lovell et al. |
| 7,376,601 | B1 | 5/2008 | Aldridge |
| 7,376,604 | B1 | 5/2008 | Butcher |
| 7,376,632 | B1 | 5/2008 | Sadek et al. |
| 7,383,201 | B2 | 6/2008 | Matsuzaki et al. |
| 7,386,833 | B2 | 6/2008 | Granny et al. |
| 7,406,716 | B2 | 7/2008 | Kanamori et al. |
| 7,415,697 | B1 | 8/2008 | Houlding |
| 7,418,409 | B1 | 8/2008 | Goel |
| 7,418,424 | B2 | 8/2008 | Martin et al. |
| 7,448,022 | B1 | 11/2008 | Ram et al. |
| 7,451,432 | B2 | 11/2008 | Shukla et al. |
| 7,460,654 | B1 | 12/2008 | Jenkins et al. |
| 7,461,030 | B2 | 12/2008 | Hibler et al. |
| 7,469,233 | B2 | 12/2008 | Shooks et al. |
| 7,516,088 | B2 | 4/2009 | Johnson et al. |
| 7,523,054 | B2 | 4/2009 | Tyson-Quah |
| 7,529,699 | B2 | 5/2009 | Fuse et al. |
| 7,536,325 | B2 | 5/2009 | Randell et al. |
| 7,536,354 | B1 | 5/2009 | deGroeve et al. |
| 7,546,520 | B2 | 6/2009 | Davidson et al. |
| 7,546,575 | B1 | 6/2009 | Dillman et al. |
| 7,565,640 | B2 | 7/2009 | Shukla et al. |
| 7,624,371 | B2 | 11/2009 | Kulkarni et al. |
| 7,631,291 | B2 | 12/2009 | Shukla et al. |
| 7,640,195 | B2 | 12/2009 | Von Zimmermann et al. |
| 7,640,291 | B2 | 12/2009 | Maturana et al. |
| 7,644,390 | B2 | 1/2010 | Khodabandehloo et al. |
| 7,657,406 | B2 | 2/2010 | Tolone et al. |
| 7,657,445 | B1 | 2/2010 | Goux |
| 7,665,083 | B2 | 2/2010 | Demant et al. |
| 7,668,761 | B2 | 2/2010 | Jenkins et al. |
| 7,672,888 | B2 | 3/2010 | Allin et al. |
| 7,681,176 | B2 | 3/2010 | Wills et al. |
| 7,693,586 | B2 | 4/2010 | Dumas et al. |
| 7,703,073 | B2 | 4/2010 | Illowsky et al. |
| 7,739,160 | B1 | 6/2010 | Ryan et al. |
| 7,742,985 | B1 | 6/2010 | Digrigoli et al. |
| 7,747,980 | B2 | 6/2010 | Illowsky et al. |
| 7,765,156 | B2 | 7/2010 | Staniar et al. |
| 7,765,521 | B2 | 7/2010 | Bryant |
| 7,788,145 | B2 | 8/2010 | Wadawadigi et al. |
| 7,788,319 | B2 | 8/2010 | Schmidt |
| 7,793,256 | B2 | 9/2010 | Charisius et al. |
| 7,793,258 | B2 | 9/2010 | Sundararajan et al. |
| 7,797,698 | B2 | 9/2010 | Diament et al. |
| 7,814,142 | B2 | 10/2010 | Mamou et al. |
| 7,822,682 | B2 | 10/2010 | Arnold et al. |
| 7,835,971 | B2 | 11/2010 | Stockton et al. |
| 7,886,041 | B2 | 2/2011 | Outhred et al. |
| 7,895,568 | B1 | 2/2011 | Goodwin et al. |
| 7,904,350 | B2 | 3/2011 | Ayala et al. |
| 7,912,755 | B2 | 3/2011 | Perry et al. |
| 7,917,889 | B2 | 3/2011 | Devarakonda et al. |
| 7,925,985 | B2 | 4/2011 | Moore |
| 8,001,519 | B2 | 8/2011 | Conallen et al. |
| 2001/0052108 | A1 | 12/2001 | Bowman-Amuah |
| 2002/0026394 | A1 | 2/2002 | Savage et al. |
| 2002/0042756 | A1 | 4/2002 | Kumar et al. |
| 2002/0049622 | A1 | 4/2002 | Lettich et al. |
| 2002/0073114 | A1 | 6/2002 | Nicastro et al. |
| 2002/0078046 | A1 | 6/2002 | Uluakar et al. |
| 2002/0082892 | A1* | 6/2002 | Raffel et al. .................. 705/8 |
| 2002/0103660 | A1 | 8/2002 | Cramon et al. |
| 2002/0104071 | A1 | 8/2002 | Charisius et al. |
| 2002/0107826 | A1 | 8/2002 | Ramachandran et al. |
| 2002/0120553 | A1 | 8/2002 | Bowman-Amuah |
| 2002/0133368 | A1 | 9/2002 | Strutt et al. |
| 2002/0138281 | A1 | 9/2002 | Cirulli et al. |
| 2002/0138358 | A1 | 9/2002 | Scheer |
| 2002/0143598 | A1 | 10/2002 | Scheer |

| Publication No. | Date | Inventor |
|---|---|---|
| 2002/0156695 A1 | 10/2002 | Edwards |
| 2002/0161907 A1 | 10/2002 | Moon |
| 2002/0184111 A1 | 12/2002 | Swanson |
| 2002/0188486 A1 | 12/2002 | Gil et al. |
| 2002/0198798 A1 | 12/2002 | Ludwig et al. |
| 2002/0198828 A1 | 12/2002 | Ludwig et al. |
| 2003/0009754 A1 | 1/2003 | Rowley et al. |
| 2003/0069774 A1 | 4/2003 | Hoffman et al. |
| 2003/0074271 A1 | 4/2003 | Viswanath et al. |
| 2003/0074360 A1 | 4/2003 | Chen et al. |
| 2003/0083762 A1 | 5/2003 | Farrah et al. |
| 2003/0084127 A1 | 5/2003 | Budhiraja et al. |
| 2003/0130860 A1 | 7/2003 | Datta et al. |
| 2003/0182206 A1 | 9/2003 | Hendrix et al. |
| 2003/0212602 A1 | 11/2003 | Schaller |
| 2003/0233290 A1 | 12/2003 | Yang et al. |
| 2004/0015367 A1 | 1/2004 | Nicastro et al. |
| 2004/0034578 A1 | 2/2004 | Oney et al. |
| 2004/0093268 A1 | 5/2004 | Ramchandani et al. |
| 2004/0111304 A1 | 6/2004 | Meka et al. |
| 2004/0111639 A1 | 6/2004 | Schwartz et al. |
| 2004/0128180 A1 | 7/2004 | Abel et al. |
| 2004/0133481 A1 | 7/2004 | Schwarze et al. |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0181470 A1 | 9/2004 | Grounds |
| 2004/0181538 A1 | 9/2004 | Lo et al. |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward |
| 2005/0033588 A1 | 2/2005 | Ruiz et al. |
| 2005/0044015 A1* | 2/2005 | Bracken et al. ............... 705/30 |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1* | 6/2005 | Erbey et al. ............... 705/40 |
| 2005/0144226 A1 | 6/2005 | Purewal |
| 2005/0156500 A1 | 7/2005 | Birecki et al. |
| 2005/0160104 A1 | 7/2005 | Meera et al. |
| 2005/0165784 A1* | 7/2005 | Gomez et al. ............... 707/9 |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0222896 A1 | 10/2005 | Rhyne et al. |
| 2005/0235020 A1 | 10/2005 | Gabelmann et al. |
| 2005/0240592 A1 | 10/2005 | Mamou et al. |
| 2005/0246250 A1* | 11/2005 | Murray ............... 705/30 |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0257197 A1 | 11/2005 | Herter et al. |
| 2005/0262192 A1 | 11/2005 | Mamou et al. |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1* | 12/2005 | Krishan et al. ............... 705/64 |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1* | 4/2006 | Seubert et al. ............... 707/100 |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1 | 5/2006 | Buchmann et al. |
| 2006/0129978 A1 | 6/2006 | Abrari et al. |
| 2006/0143029 A1 | 6/2006 | Akbay et al. |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |
| 2007/0143164 A1 | 6/2007 | Kaila et al. |
| 2007/0150332 A1 | 6/2007 | Grichnik et al. |
| 2007/0150387 A1 | 6/2007 | Seubert et al. |
| 2007/0150855 A1 | 6/2007 | Jeong |
| 2007/0156430 A1 | 7/2007 | Kaetker et al. |
| 2007/0156474 A1 | 7/2007 | Scherberger et al. |
| 2007/0156475 A1 | 7/2007 | Berger et al. |
| 2007/0156476 A1 | 7/2007 | Koegler et al. |
| 2007/0156482 A1 | 7/2007 | Bagheri |
| 2007/0156489 A1 | 7/2007 | Berger et al. |
| 2007/0156493 A1 | 7/2007 | Tebbe et al. |
| 2007/0156500 A1 | 7/2007 | Merkel et al. |
| 2007/0156538 A1 | 7/2007 | Peter et al. |
| 2007/0156550 A1 | 7/2007 | Der Emde et al. |
| 2007/0156731 A1 | 7/2007 | Ben-Zeev |
| 2007/0162893 A1 | 7/2007 | Kaetker et al. |
| 2007/0168303 A1 | 7/2007 | Kaetker et al. |
| 2007/0174068 A1 | 7/2007 | Alfandary et al. |
| 2007/0174145 A1 | 7/2007 | Hetzer et al. |
| 2007/0174811 A1 | 7/2007 | Kaetker et al. |
| 2007/0186209 A1 | 8/2007 | Kaetker et al. |
| 2007/0197877 A1 | 8/2007 | Decorte et al. |
| 2007/0198391 A1 | 8/2007 | Dreyer et al. |
| 2007/0214065 A1 | 9/2007 | Kahlon et al. |
| 2007/0220046 A1 | 9/2007 | Kaetker et al. |
| 2007/0220143 A1 | 9/2007 | Lund et al. |
| 2007/0233539 A1 | 10/2007 | Suenderhauf et al. |
| 2007/0233541 A1 | 10/2007 | Schorr et al. |
| 2007/0233574 A1 | 10/2007 | Koegler et al. |
| 2007/0233575 A1 | 10/2007 | Berger et al. |
| 2007/0233598 A1 | 10/2007 | Der Emde et al. |
| 2007/0234282 A1 | 10/2007 | Prigge et al. |
| 2007/0239508 A1 | 10/2007 | Fazal et al. |
| 2007/0239569 A1 | 10/2007 | Lucas et al. |
| 2007/0265862 A1 | 11/2007 | Freund et al. |
| 2008/0004929 A9* | 1/2008 | Raffel et al. ............... 705/8 |
| 2008/0017722 A1 | 1/2008 | Snyder et al. |
| 2008/0027831 A1 | 1/2008 | Gerhardt |
| 2008/0065437 A1 | 3/2008 | Dybvig |
| 2008/0120129 A1* | 5/2008 | Seubert et al. ............... 705/1 |
| 2008/0147507 A1* | 6/2008 | Langhammer ............... 705/14 |
| 2008/0162832 A1 | 7/2008 | Clayton et al. |
| 2008/0208707 A1* | 8/2008 | Erbey et al. ............... 705/26 |
| 2008/0215354 A1 | 9/2008 | Halverson et al. |
| 2009/0037287 A1* | 2/2009 | Baitalmal et al. ............... 705/26 |
| 2009/0037492 A1* | 2/2009 | Baitalmal et al. ............... 707/201 |
| 2009/0063102 A1 | 3/2009 | Hader et al. |
| 2009/0171716 A1 | 7/2009 | Suenderhauf et al. |
| 2009/0171818 A1 | 7/2009 | Penning et al. |
| 2009/0172699 A1 | 7/2009 | Jungkind et al. |
| 2009/0189743 A1 | 7/2009 | Abraham et al. |
| 2009/0192858 A1 | 7/2009 | Johnson |
| 2010/0070324 A1 | 3/2010 | Bock et al. |
| 2010/0070331 A1 | 3/2010 | Koegler et al. |
| 2010/0070336 A1 | 3/2010 | Koegler et al. |
| 2010/0070395 A1 | 3/2010 | Elkeles et al. |
| 2010/0070555 A1 | 3/2010 | Duparc et al. |
| 2010/0100464 A1 | 4/2010 | Ellis et al. |
| 2010/0138269 A1 | 6/2010 | Cirpus et al. |
| 2011/0252395 A1 | 10/2011 | Charisius et al. |

FOREIGN PATENT DOCUMENTS

| | | |
|---|---|---|
| WO | WO 2004/083984 | 9/2004 |
| WO | WO 2005/114381 | 12/2005 |

OTHER PUBLICATIONS

Anon.; "State of the Art Reports™ 13,000 MAS 90® for WINDOWS® Shipments in First Nine Months of Availability"; PR Newswire; Apr. 28, 1997.
Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.
Avery, S.; "Buyer's Guide to Software for Purchasing 2000.(Directory)"; Purchasing, vol. 129, No. 1; p. 179; Jul. 13, 2000.
"Hudson's Bay Company Realizes Fast ROI with the Oracle E-Business Suite"; PR Newswire; New York; Jan. 15, 2002; p. 1.
Office Action issued in U.S. Appl. No. 11/397,029; Jul. 21, 2009;28 pages.
Office Action issued in U.S. Appl. No. 11/323,040; Jul. 24, 2009; 35 pages.
Office Action issued in U.S. Appl. No. 11/323,590; Jul. 10, 2009; 32 pages.
Office Action issued in U.S. Appl. No. 11/322,816; Jul. 23, 2006; 41 pages.
Office Action issued in U.S. Appl. No. 11/322,851; Sep. 2, 2009; 32 pages.
Office Action issued in U.S. Appl. No. 11/323,590; Dec. 30, 2009; 31 pages.
Office Action issued in U.S. Appl. No. 11/322,482; Jan. 7, 2010; 19 pages.
Office Action issued in U.S. Appl. No. 11/322,772; Dec. 9, 2009; 14 pages.
Office Action issued in U.S. Appl. No. 11/323,039; Sep. 4, 2009; 36 pages.
Office Action issued in U.S. Appl. No. 11/323,634; Sep. 10, 2009; 15 pages.
Office Action issued in U.S. Appl. No. 11/322,383; Nov. 12, 2009; 29 pages.
Office Action issued in U.S. Appl. No. 11/396,258; Nov. 25, 2009; 9 pages.
Office Action issued in U.S. Appl. No. 12/333,085; Jun. 25, 2009; 9 pages.
Office Action issued in U.S. Appl. No. 11/396,288; Aug. 19, 2009; 20 pages.
Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.
Arch-int, S. et al.; "Development of Industrial Information Systems on the Web Using Busienss Components"; Computers in Industry; vol. 60; 2003; pp. 231-250.
Astudillo, H.; "How Conceptual System Architecture Leads to Business Process"; ACM; 2000; pp. 35-36.
Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.
Cowan, D.D. et al.; "Application Integration: Constructing Composite Applications from Interactive Components"; Software Practice and Experience; vol. 23, No. 3; Mar. 1993; pp. 255-275.
Deimel, A.; "The SAP R/3 Business Framework"; Software—Concepts & Tools; vol. 19, No. 1; 1998; pp. 29-36.
Fellner, K.J., et al.; "Classification Framework for Business Components"; System Sciences; Proceedings of the 33rd Annual Hawaii International Conference; Jan. 2000; pp. 3239-3248.
Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.
Gauthier, P. and OSS-J Architecture Board; "OSS through Java (TM) J2EE Design Guidelines"; [online]; Oct. 31, 2001; http://www.ossj.org/downloads/design_guidelines.shtml.
Gessford, J.E.; "Object-Oriented System Design"; Emerging Information Technologies for Competitive Advantage and Economic Development; Proceedings of the 1992 Information Resources Management Association International Conference; 1992; pp. 110-118.
He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.
Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.
Kythe, D.K.; "The Promise of Distributed Business Components"; Bell Labs Technical Journal; vol. 75, No. 2; Mar./Apr. 1999; pp. 20-28.
Linthicum, D.S.; "Chapter 9: RPCs, Messaging, and B2B Application Integration"; B2B Application Integration: E-Business Enable Your Enterprise; 2001; pp. 167-181.
Nori A.K. et al.; "Composite Applications: Process Based Application Development"; Lecture Notes in Computer Science; vol. 2444; Aug. 2003; pp. 48-53.
Pilhofer, F.; "Writing and Using CORBA Components"; Apr. 2002; http://www.fpx.de/MicoCCM/download/mico-ccm.pdf; 17 pages.
Ravichandran, T.; "Special Issue on Component-Based Software Development"; The Data Base for Advances in Information Systems; 2003; pp. 45-46.
SAP AG; "Designing Cross Solutions"; SAP XAPPS, [online]; Sep. 2003; pp. 1-2; http://www.sap.com/belux/platform/netweaver/pdf/BWP_CAF.pdf.
Schmid, H.A.; "Business Entity Components and Buisness Process Components"; Joop; vol. 12, No. 6; Oct. 1999; pp. 6-10, 12-15.
Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.
Singh, I. et al.; "Designing Enterprise Applications with the J2EE Platform, Second Edition"; Jun. 15, 2002.
Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.
Thomas, A.; "Enterprise JavaBeans Server Component Model for Java"; [online]; Dec. 1997; http://www.cs.indiana.edu/classes/b649-gann/ejb-white-paper.pdf.
Vergil Technology Ltd.; "Vergil Composite Application Builder Suite"; Product Datasheet [online]; 2003; pp. 1-5; http://www.webservicesmall.com.docs/VCAB_datasheet.pdf.
Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.
International Search Report and Written Opinion of the International Searching Authority issued in International Application No. PCT/EP2006/012625; Apr. 3, 2007; 8 pages.
International Preliminary Report on Patentability issued in International Application No. PCT/EP2006/012625; Jul. 1, 2008; 7 pages.
International Search Report and Written Opinion of the International Searching Authority issued in International Application No. PCT/EP2006/012614; Mar. 16, 2007; 7 pages.
International Preliminary Report on Patentability issued in International Application No. PCT/US2006/012614; Jul. 1, 2008; 6 pages.
International Search Report and Written Opinion of the International Searching Authority issued in International Application No. PCT/EP2006/012618; Apr. 3, 2007; 8 pages.
International Preliminary Report on Patentability issued in International Application No. PCT/EP2006/012618; Jul. 1, 2008; 7 pages.
International Search Report and Written Opinion of the International Searching Authority issued in International Application No. PCT/EP2006/012613; May 3, 2007; 6 pages.
International Preliminary Report on Patentability issued in International Application No. PCT/EP2006/012613; Jul. 1, 2008; 6 pages.

International Search Report and Written Opinion of the International Searching Authority issued in International Application No. PCT/EP2006/012624; Mar. 30, 2007; 9 pages.
International Preliminary Report on Patentability issued in International Application No. PCT/EP2006/012624; Jul. 1, 2008; 8 pages.
International Search Report and Written Opinion of the International Searching Authority issued in International Application No. PCT/EP2006/012623; May 7, 2007; 8 pages.
International Preliminary Report on Patentability issued in International Application No. PCT/EP2006/012623; Jul. 1, 2008; 7 pages.
International Search Report and Written Opinion of the International Searching Authority issued in International Application No. PCT/EP2006/012620; Mar. 21, 2007; 7 pages.
International Preliminary Report on Patentability issued in International Application No. PCT/EP2006/012620; Jul. 1, 2008; 6 pages.
International Search Report and Written Opinion of the International Searching Authority issued in International Application No. PCT/EP2006/012619; Apr. 19, 2007; 8 pages.
International Preliminary Report on Patentability issued in International Application No. PCT/EP2006/012619; Jul. 1, 2008; 7 pages.
International Search Report and Written Opinion of the International Searching Authority issued in International Application No. PCT/EP2006/012621; Apr. 19, 2007; 8 pages.
International Preliminary Report on Patentability issued in International Application No. PCT/EP2006/012621; Jul. 1, 2008; 7 pages.
International Search Report and Written Opinion of the International Searching Authority issued in International Application No. PCT/EP2007/002835; Aug. 9, 2007; 12 pages.
International Preliminary Report on Patentability issued in International Application No. PCT/EP2007/002835; Sep. 30, 2008; 8 pages.
Communication Pursuant to Article 94(3) EPC issued in European Application No. 06841224.6; May 15, 2009; 8 pages.
Communication Pursuant to Article 94(3) EPC issued in European Application No. 06847009.5; May 15, 2009; 10 pages.
Communication Pursuant to Article 94(3) EPC issued in European Application No. 07007130.3; Dec. 5, 2008; 6 pages.
Extended European Search Report issued in European Application No. 07007130.3; Oct. 5, 2007; 6 pages.
Office Action issued in U.S. Appl. No. 11/323,041; Apr. 30, 2009; 26 pages.
Office Action issued in U.S. Appl. No. 11/322,612; May 11, 2009; 24 pages.
Office Action issued in U.S. Appl. No. 11/322,772; Mar. 25, 2009; 12 pages.
Office Action issued in U.S. Appl. No. 11/323,590; Jan. 9, 2009; 23 pages.
Office Action issued in U.S. Appl. No. 11/396,288; Jan. 2, 2009; 18 pages.
Office Action issued in U.S. Appl. No. 11/396,288; Apr. 15, 2008; 26 pages.
"American Software Announces ASP Pricing Model for It's a-Applications Expense Business Solution"; PR Newswire; Mar. 6, 2000; 2 pages.
Bastani et al.; "Complex Open System Design by Quasi Agents: Process Oriented Modeling in Agent Based Systems"; ACM SIGSOFT; vol. 34, No. 4; 2009; pp. 1-14.
Bastani et al.; "Process Oriented Abstraction of the Complex Evolvable Systems: Problem Model Construction"; ACM SIGSOFT; vol. 33, No. 3; 2008; pp. 1-13.
"Cendant Announces Comprehensive Online Travel Booking to Meet President Bush's eTravel Initiative"; PR Newswire; Jul. 9, 2002; 3 pages.
Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.
Duc et al.; "Uniform Object Modeling Methodology and Reuse of Real Time System Using UML"; EMSOFT '05; Sep. 19-22, 2005; pp. 44-47.
Gomaa et al.; "Model Based Software Design and Adaption"; International Workshop on Software Engineering for Adaptive and Self-Managing Systems (SEAMS '07); IEEE; 2007; 10 pages.

Huang, S. et al.; "Computer-Assisted Supply Chain Configuration Based on Supply Chain Operations Reference (SCOR) Model"; Computers & Industrial Engineering 48; 2005; pp. 377-394.
Intuit Canada Ltd.; "Startup Guide—QuickBooks Basic for Windows, QuickBooks Pro for Windows, QuickBooks Premier for Windows"; 2002; 230 pages.
Lambert et al.; "Supply Chain Metrics"; International Journal of Logistics Management; vol. 12, No. 1; 2001; pp. 1-19.
Lockamy III, et al.; "Linking SCOR Planning Practices to Supply Chain Performance"; International Journal of Operationgs & Production Management; vol. 24, No. 12; pp. 1192-1218.
mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.
"Oracle Expands E-Commerce Offerings with the Acquisition of E-Travel, Inc."; PR Newswire; Mar. 9, 1999; 3 pages.
Ouyang et al.; "From Business Process Models to Process Oriented Software Systems"; ACM Transactions on Software Engineering and Methodology; vol. 19, No. 1, Article 2; Aug. 2009; pp. 1-37.
Rossi et al.; "Designing and Architecturing Process-aware Web Applications with EPML"; SAC '08; Mar. 16-20, 2008; pp. 2409-2414.
"SAP Delivers Next-generation ERP to Customers"; PR Newswire; New York; Mar. 10, 2005; 7 pages.
Schultz, G.J.; "Keeping SCOR on Your Supply Chain: Basic Operations Reference Model Updates with the Times"; Information Strategy: The Executive's Journal; Summer 2003; pp. 12-20.
Stephens, S.; "Supply Chain Council & Supply Chain Operations Reference (SCOR) Model Overview"; <http://www.supply-chain.org>; Version 5.0a; Aug. 2001; 29 pages.
Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.
"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.
Vogel et al.; "mySAP ERP for Dummies"; Published on Sep. 30, 2005; Downloaded on Mar. 23, 2001 from <http://proquest.safaribooksonline.com/9780764599958> 41 pages.
International Search Report and Written Opinion of the International Searching Authority issued in International Application No. PCT/EP2007/002841; Aug. 16, 2007; 12 pages.
International Preliminary Report on Patentability under Chapter I issued in International Application No. PCT/EP2007/002841; Sep. 30, 2008; 8 pages.
Office Action issued in U.S. Appl. No. 11/396,312 on Mar. 30, 2010; 23 pages.
Office Action issued in U.S. Appl. No. 11/322,611 on Mar. 31, 2010; 17 pages.
Notice of Allowance issued in U.S. Appl. No. 11/322,610 on Mar. 1, 2010; 12 pages.
Office Action issued in U.S. Appl. No. 11/322,398 on Apr. 2, 2010; 39 pages.
Office Action issued in U.S. Appl. No. 11/322,383; May 12, 2010; 23 pages.
Office Action issued in U.S. Appl. No. 11/322,382 on Mar. 29, 2010; 28 pages.
Office Action issued in U.S. Appl. No. 11/323,041 on Mar. 19, 2010; 26 pages.
Notice of Allowance issued in U.S. Appl. No. 11/396,259 on Mar. 29, 2010; 19 pages.
Notice of Allowance issued in U.S. Appl. No. 11/396,288; May 20, 2010; 15 pages.
Notice of Allowance issued in U.S. Appl. No. 11/396,258 on Mar. 31, 2010; 9 pages.
Supplemental Notice of Allowance issued in U.S. Appl. No. 11/396,258 on May 19, 2010; 8 pages.
Office Action issued in U.S. Appl. No. 11/396,236 on Mar. 31, 2010; 20 pages.
Office Action issued in U.S. Appl. No. 11/323,039; Apr. 14, 2010; 15 pages.

Office Action issued in U.S. Appl. No. 11/322,851; May 12, 2010; 15 pages.
Office Action issued in U.S. Appl. No. 11/323,040; Apr. 29, 2010; 17 pages.
Office Action issued in U.S. Appl. No. 11/322,612; Apr. 1, 2010; 23 pages.
Notice of Allowance issued in U.S. Appl. No. 11/397,026 on Mar. 29, 2010; 17 pages.
Notice of Allowance issued in U.S. Appl. No. 12/233,554 on May 14, 2010; 11 pages.
Notice of Allowance issued in U.S. Appl. No. 11/967,865 on Mar. 31, 2010; 16 pages.
Office Action issued in U.S. Appl. No. 11/323,634; Apr. 2, 2010; 9 pages.
Office Action issued in U.S. Appl. No. 11/322,816; Apr. 15, 2010; 27 pages.
Office Action issued in U.S. Appl. No. 11/396,327 on Apr. 1, 2010; 26 pages.
Office Action issued in U.S. Appl. No. 12/333,085; Mar. 23, 2010; 5 pages.
Cascallar, Eduardo et al.; "Assessment in the Evaluation of Self-Regulation as a Process"; Educational Psychology Review; vol. 18, No. 3; Sep. 2006; pp. 297-306.
Cool, David W.; "Activity Fund Accounting"; School Business Affairs; vol. 49, No. 6; Jun. 1983; pp. 50-52.
Office Action issued in U.S. Appl. No. 11/396,312 on Sep. 10, 2010; 23 pages.
Office Action issued in U.S. Appl. No. 11/322,611 on Sep. 16, 2010; 21 pages.
Notice of Allowance issued in U.S. Appl. No. 11/322,610 on Jun. 14, 2010; 6 pages.
Office Action issued in U.S. Appl. No. 11/322,772; Jul. 12, 2010; 18 pages.
Notice of Allowance issued in U.S. Appl. No. 11/322,398 on Jul. 23, 2010; 38 pages.
Notice of Allowance issued in U.S. Appl. No. 1/322,382 on Sep. 20, 2010; 6 pages.
Advisory Action issued in U.S. Appl. No. 11/323,041 on Jun. 7, 2010; 3 pages.
Notice of Allowance issued in U.S. Appl. No. 11/396,259 on Jul. 6, 2010; 6 pages.
Notice of Allowance issued in U.S. Appl. No. 11/396,258 on Jul. 28, 2010; 9 pages.
Office Action issued in U.S. Appl. No. 11/322,845; Jul. 15, 2010; 16 pages.
Advisory Action issued in U.S. Appl. No. 11/322,612; Jun. 24, 2010; 3 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 11/968,054 on Sep. 7, 2010; 11 pages.
Office Action issued in U.S. Appl. No. 12/233,557 on Sep. 16, 2010; 16 pages.
Notice of Allowance issued in U.S. Appl. No. 12/327,354 on Jun. 25, 2010; 16 pages.
Notice of Allowance issued in U.S. Appl. No. 11/322,482; Jul. 13, 2010; 5 pages.
Office Action issued in U.S. Appl. No. 11/323,590; Jun. 21, 2010; 25 pages.
Office Action issued in U.S. Appl. No. 11/967,483; Aug. 20, 2010; 10 pages.
Notice of Allowance issued in U.S. Appl. No. 12/333,085; Sep. 13, 2010; 8 pages.
Ferscha et al.; "A Light-Weight Component Model for Peer-to-Peer Applications"; IEEE; Mar. 23, 2004.
Flissi et al.; "A Component-based Software Infrastructure for Ubiquitous Computing"; IEEE; Jul. 4, 2005.
SAP AG; "SAP NetWeaver Visual Composer: User Guide (SAP NetWeaver Visual Composer release 6.0)"; Document version 1.1; pp. 1-208.
Strelich, Thomas P. et al.; "Simulation-Based Transformation with the Service Integration/Interoperation Infrastructure"; Technology Review Journal; Fall/Winter 2005; pp. 99115.
Notice of Allowance issued in U.S. Appl. No. 11/322,610 on Sep. 23, 2010; 6 pages.
Notice of Allowance issued in U.S. Appl. No. 11/322,610 on Dec. 22, 2010; 6 pages.
Notice of Allowance issued in U.S. Appl. No. 11/322,398 on Oct. 29, 2010; 18 pages.
Notice of Allowanced issued in U.S. Appl. No. 11/322,398 on Nov. 15, 2010; 20 pages.
Notice of Allowance issued in U.S. Appl. No. 11/396,259 on Oct. 15, 2010; 6 pages.
Notice of Allowance issued in U.S. Appl. No. 11/396,288; Dec. 28, 2010; 4 pages.
Notice of Allowance issued in U.S. Appl. No. 11/396,288; Sep. 24, 2010; 4 pages.
Office Action issued in U.S. Appl. No. 11/396,250 on Oct. 18, 2010; 15 pages.
Notice of Allowance issued in U.S. Appl. No. 11/396,258 on Nov. 16, 2010; 8 pages.
Office Action issued in U.S. Appl. No. 11/396,236 on Oct. 28, 2010; 19 pages.
Notice of Allowance issued in U.S. Appl. No. 11/322,845; Dec. 27, 2010; 16 pages.
Office Action issued in U.S. Appl. No. 11/323,040 on Nov. 5, 2010; 33 pages.
Notice of Allowance issued in U.S. Appl. No. 11/397,026 on Nov. 15, 2010; 7 pages.
Notice of Allowance issued in U.S. Appl. No. 12/233,554 on Sep. 17, 2010; 10 pages.
Notice of Allowance issued in U.S. Appl. No. 12/327,354 on Oct. 18, 2010; 16 pages.
Notice of Allowance issued in U.S. Appl. No. 11/967,865 on Oct. 6, 2010; 6 pages.
Office Action issued in U.S. Appl. No. 11/322,973 on Dec. 7, 2010; 13 pages.
Office Action issued in U.S. Appl. No. 11/404,147 on Nov. 24, 2010; 27 pages.
Bin et al.; "Component Model Optimization for Distributed Real-Time Embedded Software"; IEEE International Conference on Systems, Man and Cybernetics; Oct. 13, 2004; 6 pages.
Cox et al.; "A Formal Model for Component Based Software"; IEEE; Aug. 7, 2002; 8 pages.
Gould; "Integrating the Manufacturing Enterprise"; Automative Design & Production; 119, 1; ABI/INFORM Global; Jan. 2007; 3 pages.
Papazoglou et al; "Service-Oriented Computing Research Road Map"; http://infolab.uvt.nl/pub/papazogloump-2006-96.pdf; Mar. 1, 2006; 29 pages.
SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PBMW FAQ_50070686_en.pdf.
Notice of Allowance issued in U.S. Appl. No. 11/322,610 on Mar. 31, 2011; 6 pages.
Notice of Allowance issued in U.S. Appl. No. 1/322,382 on Jan. 6, 2011; 7 pages.
Notice of Allowance issued in U.S. Appl. No. 11/396,259 on Jan. 20, 2011; 6 pages.
Notice of Allowance issued in U.S. Appl. No. 11/396,250 on Mar. 2, 2011; 13 pages.
Notice of Allowance issued in U.S. Appl. No. 11/322,845; Apr. 8, 2011; 8 pages.
Notice of Allowance issued in U.S. Appl. No. 11/397,026 on Mar. 3, 2011; 6 pages.
Notice of Allowance issued in U.S. Appl. No. 12/233,554 on Feb. 22, 2011; 7 pages.
Office Action issued in U.S. Appl. No. 12/233,550 on Jan. 12, 2011; 29 pages.
Office Action issued in U.S. Appl. No. 12/233,557 on Mar. 4, 2011; 19 pages.

Notice of Allowance issued in U.S. Appl. No. 12/327,354 on Feb. 1, 2011; 16 pages.
Notice of Allowance issued in U.S. Appl. No. 11/396,327 on Nov. 30, 2010; 28 pages.
Notice of Allowance issued in U.S. Appl. No. 12/233,462 on Feb. 2, 2011; 11 pages.
Office Action issued in U.S. Appl. No. 11/967, 483 on Mar. 4, 2011; 6 pages.
Office Action issued in U.S. Appl. No. 12/233,417 on Apr. 7, 2011; 32 pages.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Finin et al.; "KQML as an Agent Communication Language"; retrieved on Jul. 26, 2011; pp. 456- 463. <http://portal.acm.org/citation.cfm?id=191322>.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=repl<ype=pdf>.
Kalakota et al.; "Readings in Electronic Commerce"; Addison-Wesley Longman, Inc.; 1995; ISBN: 0-201-88060-1.
Orsburn; "Spares Management Handbook"; McGrawHill; 1991; ISBN: 0/8306-7626-0.
Notice of Allowance issued in U.S. Appl. No. 12/233,554 on Jun. 27, 2011; 7 pages.
Notice of Allowance issued in U.S. Appl. No. 12/233,550 on May 11, 2011; 20 pages.
Office Action issued in U.S. Appl. No. 11/323,634 on Apr. 29, 2011; 8 pages.
Office Action issued in U.S. Appl. No. 11/322,973 on May 27, 2011; 15 pages.
Office Action issued in U.S. Appl. No. 11/404,147 on Aug. 4, 2011; 26 pages.
Notice of Allowance issued in U.S. Appl. No. 12/233,462 on May 18, 2011; 6 pages.
Office Action issued in U.S. Appl. No. 12/233,457 on May 26, 2011; 19 pages.
Office Action issued in U.S. Appl. No. 12/327,232 on May 26, 2011; 20 pages.
Office Action issued in U.S. Appl. No. 12/327,590 on Jun. 23, 2011; 16 pages.
Notice of Allowanced issued in U.S. Appl. No. 11/322,398 on May 27, 2011; 21 pages.
Notice of Allowance issued in U.S. Appl. No. 11/396,250 on Jun. 24, 2011; 5 pages.
Notice of Allowance issued in U.S. Appl. No. 11/396,258 on Jun. 28, 2011; 9 pages.
Office Action issued in U.S. Appl. No. 11/323,040 on Jul. 26, 2011; 34 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,489 on May 13, 2011; 15 pages.
Office Action issued in U.S. Appl. No. 11/967,393 o n. Apr. 15, 2011; 12 pages.
Office Action issued in U.S. Appl. No. 12/233,075 on Aug. 4, 2011; 45 pages.
Notice of Allowance issued in U.S. Appl. No. 11/967,865 on Jun. 24, 2011; 8 pages.
Anonymous; "Mastering Management"; Motor Age, vol. 25, No. 10; Oct. 2006; pp. 1-3.
Gerin et al.; "Flexible and Executable Hardware/Software Interface Modeling for Multiprocessor SOC Design Using SystemC"; IEEE; 2007; pp. 390-395.
Hahn; "A Domain Specific Modeling Language for Multi-Agent Systems"; ACM AAMAS; 2008; pp. 233-240.
Hu; "A Co-Design Modeling Approach for Computer Network Systems"; IEEE; 2007; pp. 685-693.
Kremic, Tibor; "Outsourcing Decision Support: A Survey of Benefits, Risks, and Decision Factor"; Supply Chain Management; V. 11; 2006; pp. 467-482.
Sarjoughian et al.; "CoSMoS: A Visual Environment for Component Based Modeling, Experimental Design and Simulation"; ACM; 2009; pp. 1-9.
Schaub, Thomas et al.; "Enterprise Management Application Providing Availability Control Checks on Revenue Budgets"; Aerospace & High Technology, ANTE: Abstracts in New Technologies and Engineering; Metdex, Mechanical & Transportation Engineering Abstracts; Date Unknown. p. 1.
Vescovi, Marcos and Hagmann, Christian; "Rules Engine for Enterprise System"; Areospace & High Technology, ANTE: Abstracts in New Technologies and Engineering; Metadex, Mechanical & Transportation Engineering Abstracts; Date Unknown; p. 1.
Notice of Allowance issued in U.S. Appl. No. 12/233,550 on Jan. 9, 2012; 11 pages.
Office Action issued in U.S. Appl. No. 12/333,146 on Sep. 6, 2011; 21 pages.
Office Action issued in U.S. Appl. No. 12/333,146 on Feb. 2, 2012; 21 pages.
Notice of Allowance issued in U.S. Appl. No. 11/323,634 on Jan. 25, 2012; 5 pages.
Notice of Allowance issued in U.S. Appl. No. 11/396,327 on Sep. 28, 2011; 31 pages.
Office Action issued in U.S. Appl. No. 12/233,479 on Oct. 27, 2011; 24 pages.
Office Action issued in U.S. Appl. No. 12/332,965 on Oct. 11, 2011; 6 pages.
Notice of Allowance issued in U.S. Appl. No. 12/233,462 on Sep. 2, 2011; 7 pages.
Notice of Allowance in U.S. Appl. No. 12/233,462 on Dec. 12, 2011; 6 pages.
Office Action issued in U.S. Appl. No. 12/233,289 on Oct. 27, 2011; 15 pages.
Notice of Allowance issued in U.S. Appl. No. 12/233,457 on Nov. 3, 2011; 12 pages.
Notice of Allowance issued in U.S. Appl. No. 12/327,232 on Nov. 2, 2011; 16 pages.
Notice of Allowance issued in U.S. Appl. No. 12/327,590 on Dec. 28, 2011; 10 pages.
Office Action issued in U.S. Appl. No. 12/327,701 on Nov. 8, 2011; 20 pages.
Office Action issued in U.S. Appl. No. 12/233,087 on Aug. 18, 2011; 42 pages.
Notice of Allowance issued in U.S. Appl. No. 11/322,382 on Jul. 25, 2011; 5 pages.
Notice of Allowanced issued in U.S. Appl. No. 11/322,398 on Oct. 18, 2011; 7 pages.
Office Action issued in U.S. Appl. No. 11/322,383 on May 12, 2010; 23 pages.
Office Action issued in U.S. Appl. No. 11/322,383 on Nov. 12, 2009; 23 pages.
Examiner's Answer to Appeal Brief issued in U.S. Appl. No. 11/396,236 on Nov. 10, 2011; 19 pages.
Notice of Allowance issued in U.S. Appl. No. 11/396,259 on Aug. 5, 2011; 7 pages.
Office Action issued in U.S. Appl. No. 11/396,288 on Oct. 17, 2011; 38 pages.
Notice of Allowance issued in U.S. Appl. No. 11/396,250 on Dec. 7, 2011; 6 pages.
Notice of Allowance issued in U.S. Appl. No. 11/396,258 on Feb. 3, 2012; 12 pages.
Office Action issued in U.S. Appl. No. 11/396,252 on Nov. 10, 2011; 18 pages.
Notice of Allowance issued in U.S. Appl. No. 11/322,851 on Sep. 2, 2011; 8 pages.
Notice of Allowance issued in U.S. Appl. No. 11/322,845; Nov. 13, 2011; 9 pages.
Office Action issued in U.S. Appl. No. 11/397,026; Jul. 21, 2009; 28 pages.

Notice of Allowance issued in U.S. Appl. No. 11/397,026 on Jul. 20, 2011; 8 pages.
Notice of Allowance issued in U.S. Appl. No. 11/397,026 on Nov. 4, 2011; 8 pages.
Notice of Allowance issued in U.S. Appl. No. 12/233,520 on Nov. 10, 2011; 22 pages.
Notice of Allowance issued in U.S. Appl. No. 12/233,417 on Sep. 14, 2011; 11 pages.
Notice of Allowance issued in U.S. Appl. No. 11/968,054 on Aug. 2, 2011; 5 pages.
Office Action issued in U.S. Appl. No. 12/233,458 on Oct. 12, 2011; 19 pages.
Office Action issued in U.S. Appl. No. 11/967,489 on Sep. 28, 2011; 7 pages.
Office Action issued in U.S. Appl. No. 11/967,489 on Feb. 6, 2012; 9 pages.
Notice of Allowance issued in U.S. Appl. No. 11/967,393 on Nov. 9, 2011; 9 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Notice of Allowance issued in U.S. Appl. No. 11/967,890 on Jul. 15, 2011; 7 pages.

* cited by examiner

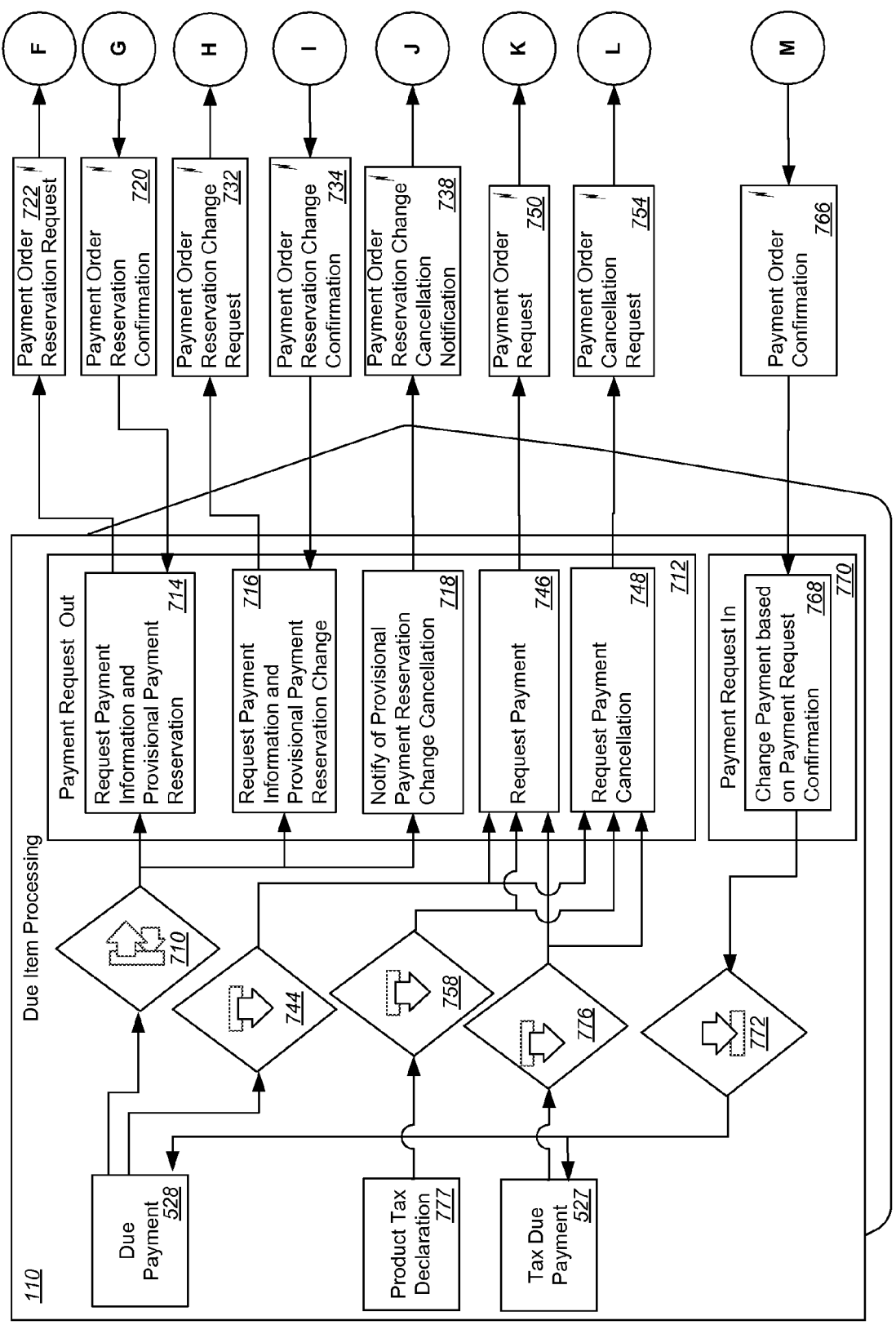

ARCHITECTURAL DESIGN FOR TAX DECLARATION APPLICATION SOFTWARE

BACKGROUND

The subject matter of this patent application relates to computer software architecture and, more particularly, to the architecture of application software for tax declaration.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

SUMMARY

This specification presents a software architecture design for a tax declaration software application.

The present software architecture design can be implemented as methods, systems, and apparatus, including computer program products, for implementing a software architecture design for a software application implementing tax declarations. The software application is structured as multiple process components interacting with each other through service operations, each implemented for a respective process component. The process components include an Accounting process component, a Due Item Processing process component, and a Payment Processing process component.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

BRIEF DESCRIPTION OF THE DRAWINGS

FIGS. 7A and 7B are block diagrams collectively showing interactions between the Due Item Processing process component and the Payment Processing process component.

DETAILED DESCRIPTION

Figure 1:
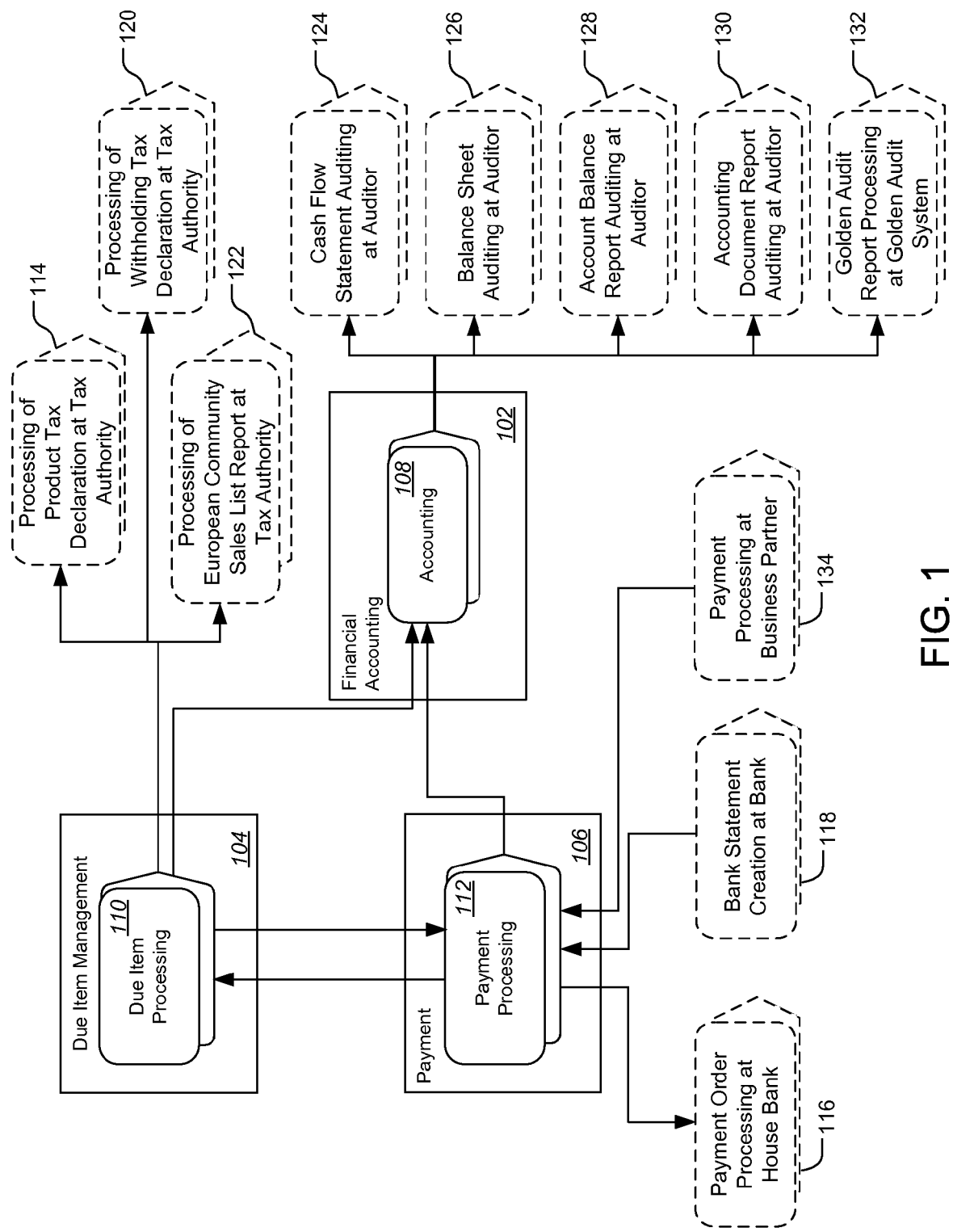
FIG. 1 is a block diagram of a software architectural design for a tax declaration software application.

FIG. 1 shows the software architectural design for a tax declaration software application. The tax declaration application is software that implements a processing of tax declarations and related tax payments to and from tax authorities.

As shown in FIG. 1, the tax declaration design includes three deployment units: a Financial Accounting deployment unit 102, a Due Item Management deployment unit 104 and a Payment deployment unit 106.

The Financial Accounting deployment unit 102 includes an Accounting process component 108 that records relevant business transactions for valuation and profitability analysis.

The Due Item Management deployment unit 104 includes a Due Item Processing process component 110. The Due Item Processing process component 110 handles the collection, management, and monitoring of trade receivables or payables and corresponding sales tax or withholding tax.

The Payment deployment unit 106 includes a Payment Processing process component 112. The Payment Processing process component 112 handles the processing and management of all payments. In addition, the Payment Processing process component 112 is responsible for associated communications with financial institutions such as banks, and provides primary input for liquidity management.

A number of external process components, described below, will be used to describe the architectural design. These include: a Processing of Product Tax Declaration at Tax Authority process component 114, a Payment Order Processing at House Bank process component 116, a Bank Statement Creation at Bank process component 118, a Processing of Withholding Tax Declaration at Tax Authority process component 120, a Processing of European Community Sales List Report at Tax Authority process component 122, a Cash Flow Statement Auditing at Auditor process component 124, a Balance Sheet Auditing at Auditor process component 126, an Account Balance Report Auditing at Auditor process component 128, an Accounting Document Report Auditing at Auditor process component 130, a Golden Audit Report Processing at Golden Audit System process component 132, and a Payment Processing at Business Partner process component 134.

The Processing of Product Tax Declaration at Tax Authority process component 114 can receive messages from the Due Item Processing process component 110. The Payment Order Processing at House Bank process component 116 can confirm a performed action, such as a bank transfer, debit, or printing action, to a requester. The Bank Statement Creation at Bank process component 118 can notify the Payment Processing process component 112 about transactions on a bank account. The Processing of Withholding Tax Declaration at Tax Authority process component 120 can receive messages from the Due Item Processing process component 110. The Processing of European Community Sales List Report at Tax Authority process component 122 can receive messages from the Due Item Processing process component 110. The Cash Flow Statement Auditing at Auditor process component 124 can receive messages from the Accounting process component 108. The Balance Sheet Auditing at Auditor process component 126 can receive messages from the Accounting process component 108. The Account Balance Report Auditing at Auditor process component 128 can receive messages from the Accounting process component 108. The Accounting Document Report Auditing at Auditor process component 130 can receive messages from the Accounting process component 108. The Golden Audit Report Processing at Golden Audit System process component 132 can receive messages from the Accounting process component 108. The Payment Processing at Business Partner process component 134 can receive messages from the Payment Processing process component 112.

Figure 2:
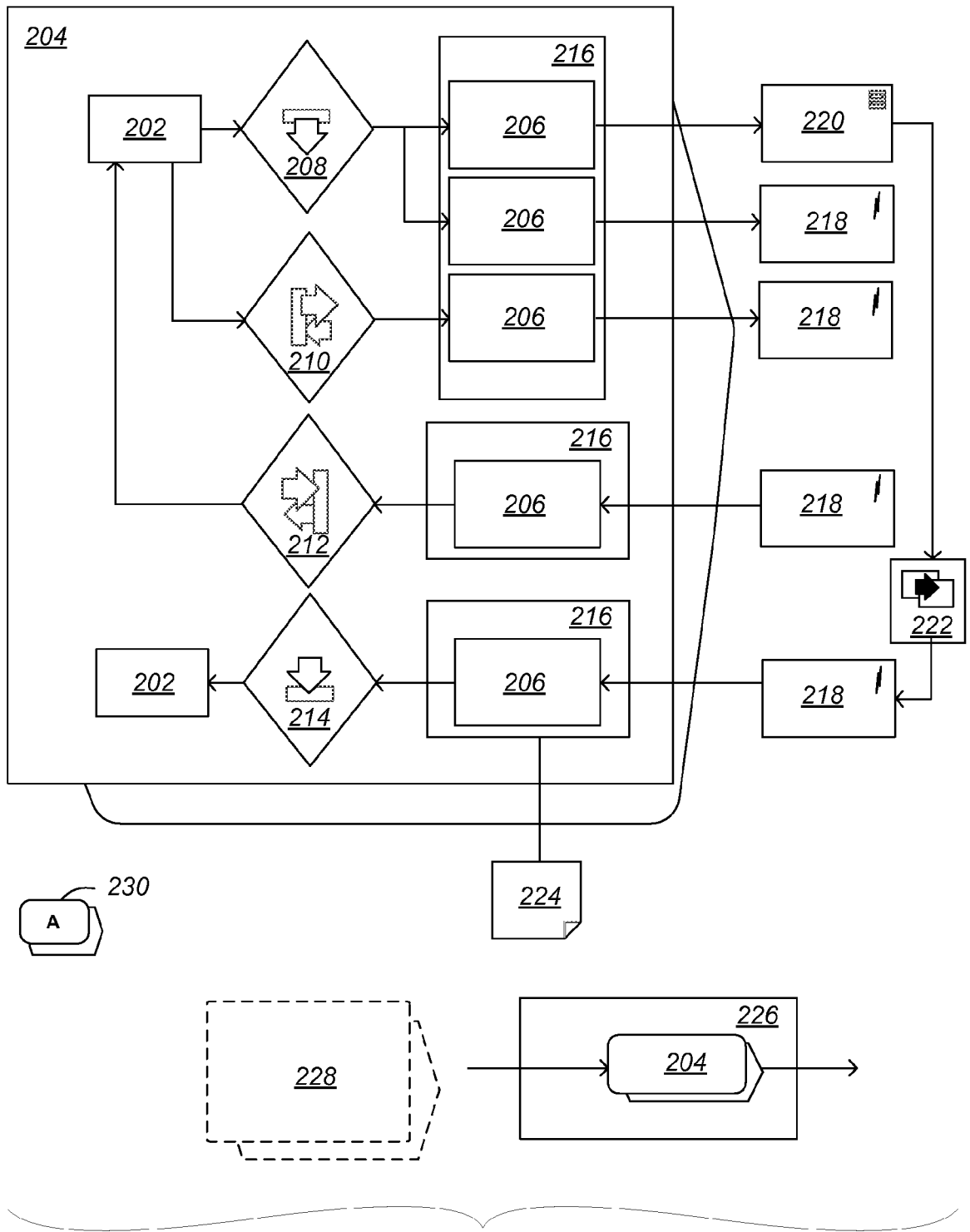
FIG. 2 illustrates the elements of the architecture as they are drawn in the figures.

FIG. 2 illustrates the elements of the architecture as they are drawn in the figures of this patent application. The elements of the architecture include the business object 202, the process component 204, the operation 206, the outbound process agent 208, the synchronous outbound process agent 210, the synchronous inbound process agent 212, the inbound process agent 214, the service interface or interface 216, the message 218, the form message 220 the mapping entity 222, the communication channel template 224, and the deployment unit 226.

Not explicitly represented in the figures is a foundation layer that contains all fundamental entities that are used in multiple deployment units 226. These entities can be process components, business objects and reuse service components. A reuse service component is a piece of software that is reused in different transactions. A reuse service component is used by its defined interfaces, which can be, e.g., local APIs (Application Programming Interfaces) or service interfaces.

A process component of an external system is drawn as a dashed-line process component 228. Such a process component 228 represents the external system in describing interactions with the external system; however, the process component 228 need not represent more of the external system than is needed to produce and receive messages as required by the process component that interacts with the external system.

The connector icon 230 is used to simplify the drawing of interactions between process components 204. Interactions between process component pairs 204 involving their respective business objects 202, process agents (at 208, 210, 212, and 214), operations 206, interfaces 216, and messages (at 218 and 22) are described as process component interactions, which determine the interactions of a pair of process components across a deployment unit boundary, i.e., from one deployment unit 226 to another deployment unit 226. Interactions between process components 204 are indicated in FIG. 1 by directed lines (arrows). Interactions between process components within a deployment unit need not be described except to note that they exist, as these interactions are not constrained by the architectural design and can be implemented in any convenient fashion. Interactions between process components that cross a deployment unit boundary will be illustrated by the figures of this patent application; these figures will show the relevant elements associated with potential interaction between two process components 204, but interfaces 216, process agents (at 208, 210, 212, and 214), and business objects 202 that are not relevant to the potential interaction will not be shown.

The architectural design is a specification of a computer software application, and elements of the architectural design can be implemented to realize a software application that implements the end-to-end process mentioned earlier. The elements of the architecture are at times described in this specification as being contained or included in other elements; for example, a process component 204 is described as being contained in a deployment unit 226. It should be understood, however, that such operational inclusion can be realized in a variety of ways and is not limited to a physical inclusion of the entirety of one element in another.

The architectural elements include the business object 202. A business object 202 is a representation of a type of a uniquely identifiable business entity (an object instance) described by a structural model. Processes operate on business objects. This example business object represents a specific view on some well-defined business content. A business object represents content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component 204, is an object that encapsulates transactional data (i.e., data that is valid for a point in time). The term business object will be used generically to refer to a business process object and a master data object, unless the context requires otherwise. Properly implemented, business objects 202 are implemented free of redundancies.

The architectural elements also include the process component 204. A process component 204 is a software package that realizes a business process and generally exposes its functionality as services. The functionality includes the ability to perform all or parts of particular kinds of business transactions. A process component 204 contains one or more semantically related business objects 202. Any business object belongs to no more than one process component. Process components can be categorized as a standard process component, a process component at a business partner, a third party process component, or a user centric process component. The standard process component (named simply process component) is a software package that realizes a business process and exposes its functionality as services. The process component at a business partner is a placeholder for a process component (or other technology that performs the essential functions of the process component) used at a business partner. The third party process component is a process component (or other technology that performs the essential functions of the process component) provided by a third party. The user centric process component is a process component containing user interface parts.

Process components 204 are modular and context-independent. That they are context-independent means that a process component 204 is not specific to any specific application and is reusable. The process component 204 is often the smallest (most granular) element of reuse in the architecture.

The architectural elements also include the operation 206. An operation 206 belongs to exactly one process component 204. A process component 204 generally is able to perform multiple operations 206. Operations 206 can be synchronous or asynchronous, corresponding to synchronous or asynchronous process agents (e.g. at 208, 210, 212, and 214), which will be described below. Operation 206 may be the smallest, separately-callable function, described by a set of data types used as input, output, and fault parameters serving as a signature.

The architectural elements also include the service interface 216, referred to simply as the interface. An interface 216 is a named group of operations 206. Interface 216 typically specifies inbound service interface functionality or outbound service interface functionality. Each operation 206 belongs to exactly one interface 216. An interface 216 belongs to exactly one process component 204. A process component 204 might contain multiple interfaces 216. In some implementations, an interface contains only inbound or outbound operations, but not a mixture of both. One interface can contain both synchronous and asynchronous operations. All operations of the same type (either inbound or outbound) which belong to the same message choreography will belong to the same interface. Thus, generally, all outbound operations 206 directed to the same other process component 204 are in one interface 216.

The architectural elements also include the message 218. Operations 206 transmit and receive messages 218. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component. In some implementations, the message is a form based message 220 that can be translated into a recognized format for an external process component 228. The form message type 220 is a message type used for documents structured in forms. The form message type 220 can be used for printing, faxing, emailing, or other events using documents structured in forms. In some implementations, the form message type 220 provides an extended signature relative to the normal message type. For example, the form message type 220 can include text information in addition to identification information to improve human reading.

The architectural elements also include the process agent (e.g. at 208, 210, 212, and 214). Process agents do business processing that involves the sending or receiving of messages 218. Each operation 206 will generally have at least one associated process agent. The process agent can be associated with one or more operations 206. Process agents (at 208, 210, 212, and 214) can be either inbound or outbound, and either synchronous or asynchronous.

Asynchronous outbound process agents 208 are called after a business object 202 changes, e.g., after a create, update, or delete of a business object instance. Synchronous outbound process agents 210 are generally triggered directly by a business object 202.

An outbound process agent (208 and 210) will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents (212 and 214) are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents (210 and 212) are used when a process component requires a more or less immediate response from another process component, and is waiting for that response to continue its work.

Operations and process components are described in this specification in terms of process agents. However, in alternative implementations, process components and operations can be implemented without use of agents by using other conventional techniques to perform the functions described in this specification.

The architectural elements also include the communication channel template. The communication channel template is a modeling entity that represents a set of technical settings used for communication. The technical settings can include details for inbound or outbound processing of a message. The details can be defined in the communication channel template. In particular, the communication channel template defines an adapter type, a transport protocol, and a message protocol. In some implementations, various other parameters may be defined based on a selected adapter type. For example, the communication channel template can define a security level, conversion parameters, default exchange infrastructure parameters, processing parameters, download URI parameters, and specific message properties.

The communication channel template 224 can interact with internal or external process components (at 204 and 228). To interact with an internal process component, the communication channel template is received and uploaded to be used with an operation and interface pair. To interact with an external process component, the communication channel template is received and uploaded to be used with an external entity, such as an external bank, business partner, or supplier.

The elements also include the deployment unit 226. A deployment unit 226 includes one or more process components 204 that are deployed together on a single computer system platform. Conversely, separate deployment units can be deployed on separate physical computing systems. For this reason, a boundary of a deployment unit 226 defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components 204 of one instance of one deployment unit 226.

The process components 204 of one deployment unit 226 interact with those of another deployment unit 226 using messages 218 passed through one or more data communication networks or other suitable communication channels. Thus, a deployment unit 226 deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units 226 is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interaction within other deployment units. Similarly, process components 204 that interact with other process components 204 or external systems only through messages 218, e.g., as sent and received by operations 206, can also be replaced as long as the replacement supports the operations 206 of the original 204.

In contrast to a deployment unit 226, the foundation layer does not define a limit for application-defined transactions. Deployment units 226 communicate directly with entities in the foundation layer, which communication is typically not message based. The foundation layer is active in every system instance on which the application is deployed. Business objects 202 in the foundation layer will generally be master data objects. In addition, the foundation layer will include some business process objects that are used by multiple deployment units 226. Master data objects and business process objects that should be specific to a deployment unit 226 are assigned to their respective deployment unit 226.

Interactions Between Process Components "Payment Processing" and "Accounting"

Figure 3:
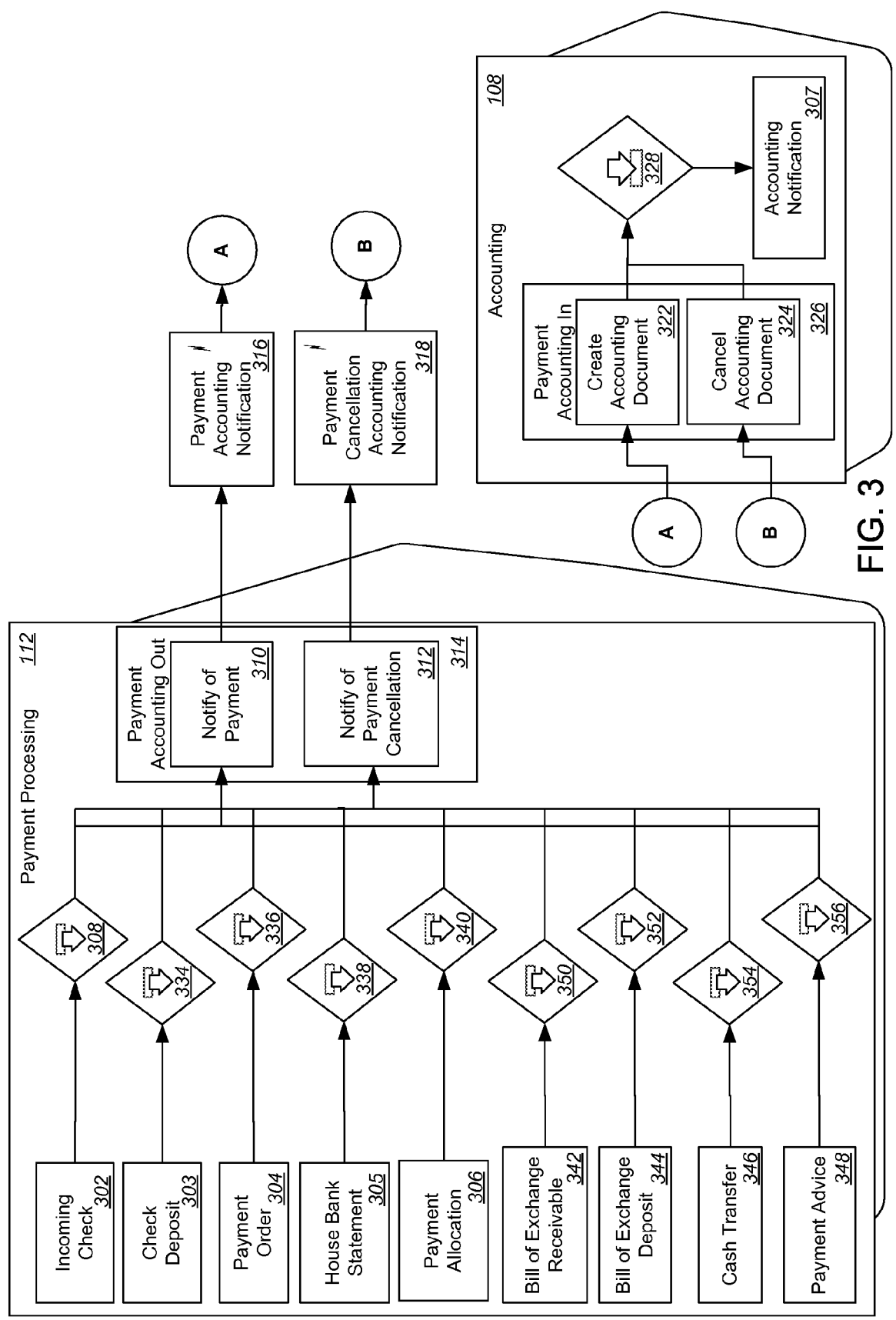
FIG. 3 is a block diagram showing interactions between a Payment Processing process component and an Accounting process component.

FIG. 3 is a block diagram showing interactions between the Payment Processing process component 112 and the Accounting process component 108 in the architectural design of FIG. 1.

The Payment Processing process component 112 can notify the Accounting process component 108 about the creation or cancellation of a payment ordered, received or allocated. The Payment Processing process component 112 processes and manages payments received, as well as the associated communication with financial institutions such as banks. In addition, the Payment Processing process component provides input for liquidity management.

As shown in FIG. 3, the Payment Processing process component 112 includes an Incoming Check business object 302, a Check Deposit business object 303, a Payment Order business object 304, a House Bank Statement business object 305, a Payment Allocation business object 306, a Bill of Exchange Receivable business object 342, a Bill of Exchange Deposit business object 344, a Cash Transfer business object 346, and a Payment Advice business object 348. The Incoming Check business object 302 represents a check issued by a business partner payable to the company. The Check Deposit business object 303 represents a deposit of checks at a house bank for credit to a house bank account. The Payment Order business object 304 represents an order within a company to make a payment to a business partner at a specified time. A payment order can be a collective order that contains several individual orders. The House Bank Statement business object 305 represents a legally binding notification from the house bank about the revenues within a specific time period at a house bank account with a defined starting and closing balance. The Payment Allocation business object 306 represents an assignment of a payment item to the payment reasons from which the payment item originated. The Bill of Exchange Receivable business object 342 represents a bill of exchange issued either by the company or by a business partner for the benefit of the company. The Bill of Exchange Deposit business object 344 represents a deposit of bills of exchange receivable at a house bank for credit to a house bank account. The Cash Transfer business object 346 represents a company-internal money transfer that can include payments from one house bank account to another (house bank account transfer), payments from one cash storage to another (cash transfer), payments from a cash storage to a house bank account (cash deposit), and/or payments from a house bank account to a cash storage (cash withdrawal). The Payment Advice business object 348 represents an announcement of a payment transaction by a business partner to the company specifying payment reasons.

The Incoming check business object 302 uses a Notify of Payment from Incoming Check to Accounting outbound process agent 308 to invoke a Notify of Payment operation 310 or a Notify of Payment Cancellation operation 312. The operations 310 and 312 are included in a Payment Accounting Out interface 314.

The Check Deposit business object 303 uses a Notify of Payment from Check Deposit to Accounting outbound process agent 334 to invoke the Notify of Payment operation 310 or the Notify of Payment Cancellation operation 312.

The Payment Order business object 304 uses a Notify of Payment from Payment Order to Accounting outbound process agent 336 to invoke the Notify of Payment operation 310 or the Notify of Payment Cancellation operation 312.

The House Bank Statement business object 305 uses a Notify of Payment from Bank Statement to Accounting outbound process agent 338 to invoke the Notify of Payment operation 310 or the Notify of Payment Cancellation operation 312.

The Payment Allocation business object 306 uses a Notify of Payment from Payment Allocation to Accounting outbound process agent 340 to invoke the Notify of Payment operation 310 or the Notify of Payment Cancellation operation 312.

The Bill of Exchange Receivable business object 342 uses a Notify of Payment from Bill of Exchange Receivable to Accounting outbound process agent 350 to invoke the Notify of Payment operation 310 or the Notify of Payment Cancellation operation 312.

The Bill of Exchange Deposit business object 344 uses a Notify of Payment from Bill of Exchange Deposit to Accounting outbound process agent 352 to invoke the Notify of Payment operation 310 or the Notify of Payment Cancellation operation 312.

The Cash Transfer business object 346 uses a Notify of Payment Cash Transfer to Accounting outbound process agent 354 to invoke the Notify of Payment operation 310 or the Notify of Payment Cancellation operation 312.

The Payment Advice business object 348 uses a Notify of Payment from Payment Advice to Accounting outbound process agent 356 to invoke the Notify of Payment operation 310 or the Notify of Payment Cancellation operation 312.

If the Notify of Payment operation 310 is invoked, the operation 310 generates a Payment Accounting Notification message 316. If the Notify of Payment Cancellation operation 312 is invoked, the operation 312 generates a Payment Cancellation Accounting Notification message 318. Both messages 316, 318 are sent to the Accounting process component 108.

A Create Accounting Document operation 322 receives the Payment Accounting Notification message 316. A Cancel Accounting Document operation 324 receives the Payment Cancellation Accounting Notification message 318. The operations 322 and 324 are included in a Payment Accounting Out interface 326. The operations 322 and 324 use a Maintain Accounting Document based on Payment inbound process agent 328 to update an Accounting Notification business object 307. The Accounting Notification business object 307 represents a notification sent to the Accounting process component 108 by an operational component regarding a business transaction. For example, the Accounting Notification business object 307 can represent the operational business transaction in a standardized form for all business transaction documents, and can include the data needed to valuate the business transaction.

Interactions Between Process Components "Bank Statement Creation at Bank" and "Payment Processing"

Figure 4:
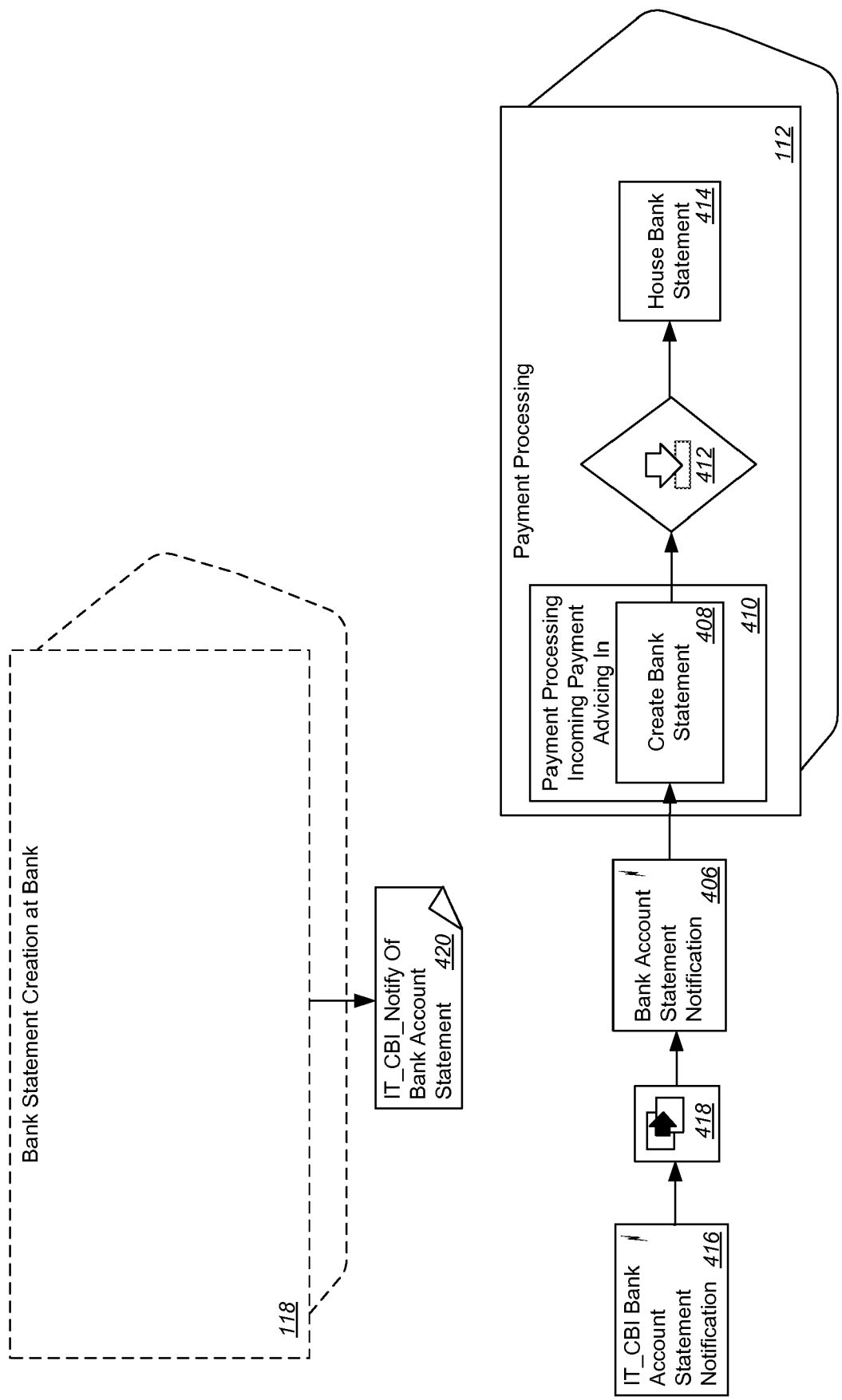
FIG. 4 is a block diagram showing interactions between a Bank Statement Creation at Bank process component and the Payment Processing process component.

FIG. 4 is a block diagram showing interactions between the Bank Statement Creation at Bank process component 118 and the Payment Processing process component 112 in the architectural design of FIG. 1. The interactions start when a bank statement is created at a bank. The Bank Statement Creation at Bank process component 118 notifies the Payment Processing process component 112 about transactions on a bank account. In some implementations, a bank account statement can be in the format of the national electronic banking standard CBI (Corporate Banking Interbancario), established by the Italian Banking Association (ABI) and the major Italian (IT) banks.

As shown in FIG. 4, a bank statement is created at a bank and an IT_CBI Bank Account Statement Notification message 416 with statement information is generated. The IT_CBI Bank Account Statement Notification message 416 uses Mapping Entity 418 to transform the IT_CBI formatted message to a Bank Account Statement Notification message 406. The message 406 is received in the Payment Processing process component 116 where a Create Bank Statement operation 408 is invoked to create a bank statement. The Create Bank Statement operation 408 is included in a Payment Processing Incoming Payment Advicing In interface 410. A Maintain Bank Statement inbound process agent 412 updates a House Bank Statement business object 414 by creating a new bank statement. The House Bank Statement business object 414 represents a legally binding notification from the house bank about the revenues items within a specific time period at a house bank account with a defined starting and closing balance.

The Bank Statement Creation at Bank process component 124 receives information from the Payment Processing process component 116 using an IT_CBI_Notify Of Bank Account Statement communication channel template 420. The communication channel template 420 can provide information from an external party about a bank statement.

Interactions Between Process Components "Payment Processing" and "Due Item Processing"

Figure 5:
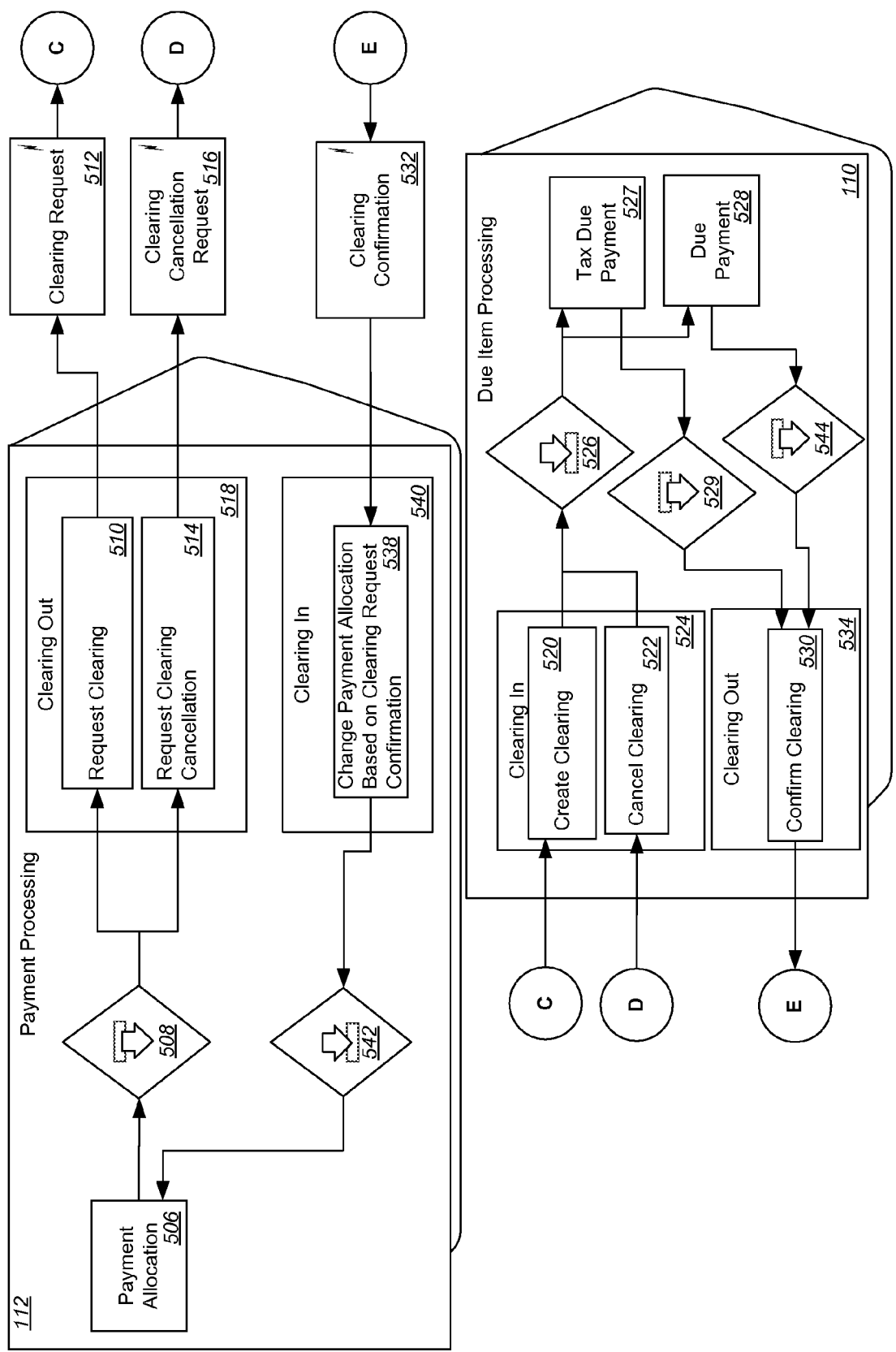
FIG. 5 is a block diagram showing interactions between the Payment Processing process component and a Due Item Processing process component.

FIG. 5 is a block diagram showing interactions between the Payment Processing process component 112 and the Due Item Processing process component 110 in the architectural design of FIG. 1. The interaction starts when a payment allocation is created or cancelled with the Due Item Processing process component 110 responsible for the clearing of a payment. The Payment Processing process component 112 requests the clearing or the cancellation of a clearing from the Due Item Processing process component 110. The Due Item Processing process component 110 informs the requester about the clearing result.

As shown in FIG. 5, the Payment Processing process component 112 includes a Payment Allocation business object 506. The Payment Allocation business object 506 represents the assignment of a payment item to a payment reason from which the payment item originated.

The Payment Allocation business object 506 uses a Request Clearing Maintenance from Payment Allocation to Due Item Processing outbound process agent 508 to invoke a Request Clearing operation 510. The operation 510 generates a Clearing Request message 512. The message 512 requests the clearing of payments within the Due Item Processing process component 110. The Request Clearing Maintenance from Payment Allocation to Due Item Processing outbound process agent 508 can also use a Request Clearing Cancellation operation 514 to cancel a payment clearing using a Clearing Cancellation Request message 516. Both operations 510 and 514 are included in a Clearing Out interface 518.

The message 512 is received by a Create Clearing operation 520. The operation 520 creates a clearing for business partner-initiated payments. Similarly, the Clearing Cancellation Request message 516 is received by a Cancel Clearing operation 522. The operation 516 cancels a previously sent clearing request by reference. The Create Clearing operation 520 and the Cancel Clearing operation 522 are both included in a Clearing In interface 524. Upon creating or canceling a clearing, a Maintain Clearing inbound process agent 526 updates a Tax Due Payment business object 527 or a Due Payment business object 528, or both.

The Tax Due Payment business object 527 represents a payment request or payment confirmation with regard to trade receivables and payables (e.g., from goods and/or services, etc.). The Due Payment business object 528 represents a payment request or payment confirmation with regard to trade receivables and payables.

The Tax Due Payment business object 527 uses a Confirm Clearing from Due Payment to Payment Processing outbound process agent 529 to invoke a Confirm Clearing operation 530. The operation 530 is included in a Clearing Out interface 534. The operation 530 can initiate a Clearing Confirmation message 532 to the Payment Processing process component 112. The message 532 is received by the Payment Processing process component 112 and handled by a Change Payment Allocation Based on Clearing Request Confirmation operation 538. The operation 538 confirms the execution or rejection of a sent clearing request. The operation 538 is included in a Clearing In interface 540. An update can be made to the Payment Allocation business object 506 using a Change Payment Allocation Based on Clearing Request Confirmation inbound process agent 542.

The Due Payment business object 528 uses a Confirm Clearing from Product Tax Declaration to Payment Processing outbound process agent 544 to invoke the Confirm Clearing operation 530. The agent 544 can confirm or reject clearing of a foreign-initiated payment for tax receivables payables from product tax. The operation 530 can initiate the Clearing Confirmation message 532 to the Payment Processing process component 112. The message 532 is received by the Payment Processing process component 112 and handled by the Change Payment Allocation Based on Clearing Request Confirmation operation 538. The operation 538 confirms the execution or rejection of a sent clearing request. An update can be made to the Payment Allocation business object 506 using the Change Payment Allocation Based on Clearing Request Confirmation inbound process agent 542.

Interactions Between Process Components "Payment Processing" and "Payment Order Processing at House Bank"

Figure 6:
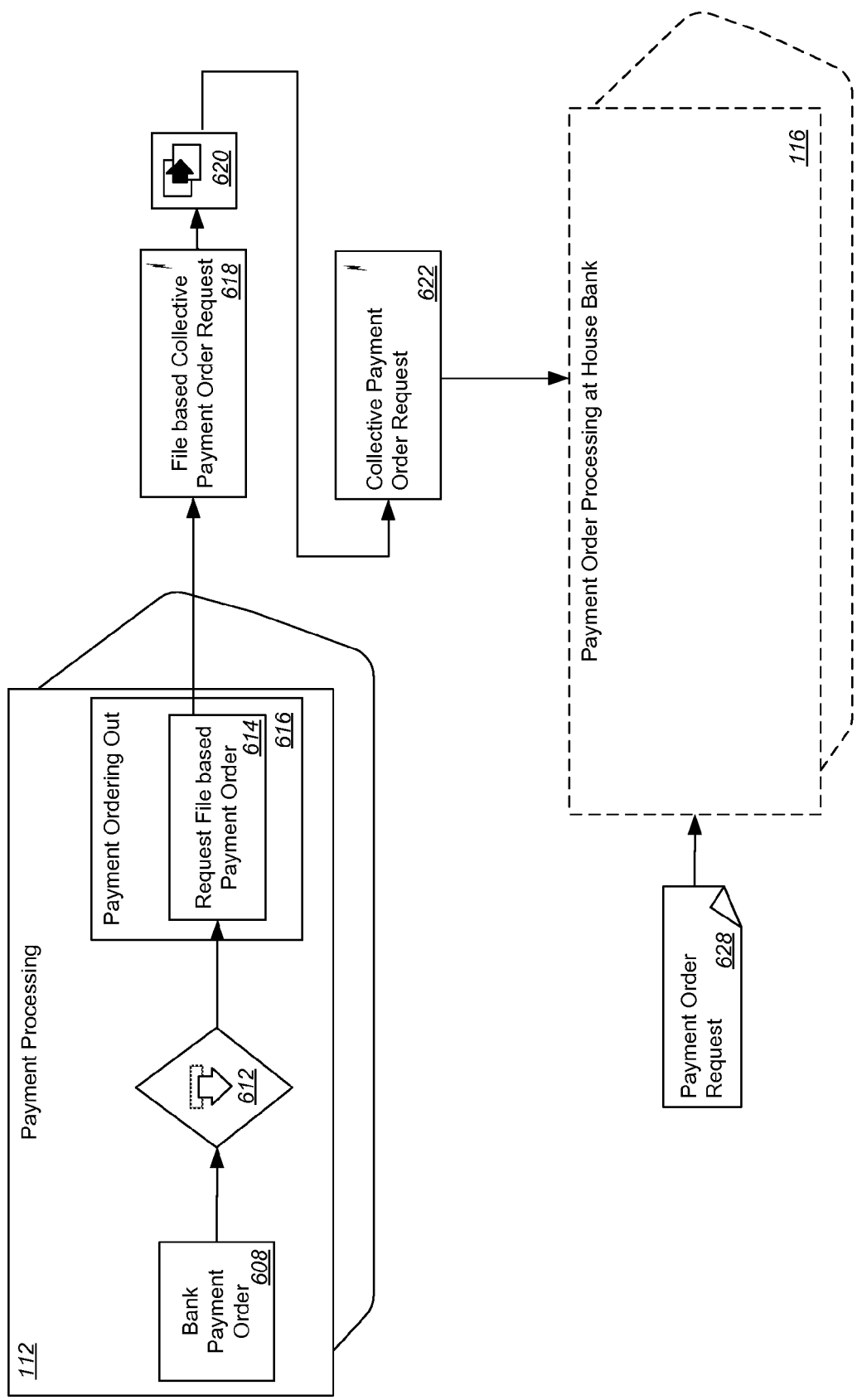
FIG. 6 is a block diagram shown interactions between the Payment Processing process component and a Payment Order at House Bank process component.

FIG. 6 is a block diagram showing interactions between the Payment Processing process component 112 and the Payment Order Processing at House Bank process component 116 in the architectural design of FIG. 1.

As shown in FIG. 6, the Payment Processing process component 112 includes a Bank Payment Order business object 608. The Bank Payment Order business object 608 represents an order to a house bank to make a transfer or direct debit from a specified house bank account to fulfill a payment order. In some instances, the house bank can be a bank located in France.

The Bank Payment Order business object 608 uses a Request File Based Payment Order from Bank Payment Order to House Bank outbound process agent 612 to invoke a Request File based Payment Order operation 614. The Request File based Payment Order operation 614 instructs a house bank, using a file, to make a bank transfer or a direct debit. The operation 614 is included in a Payment Ordering Out interface 616. The Request File based Payment Order operation 614 generates a File based Collective Payment Order Request message 618. The File based Collective Payment Order Request message 618 uses Mapping Entity 620 to transform the file-based message type to a Collective Payment Order Request message 622 that can be received by the Payment Order Processing at House Bank process component 116. The Collective Payment Order Request message 622 is in a format that the house bank (e.g., a bank located in France) can understand. A collective payment order can be an instruction based on a file transfer to a credit institution to carry out one or more payment transactions (e.g., bank transfers or direct debits). The Payment Order Processing at House Bank process component 116 receives information from the Payment Processing process component 112 using a Payment Order Request communication channel template 628. The communication channel template 628 can provide information from a third party about a payment order request.

Interactions Between Process Components "Due Item Processing" and "Payment Processing"

Figure 7B:
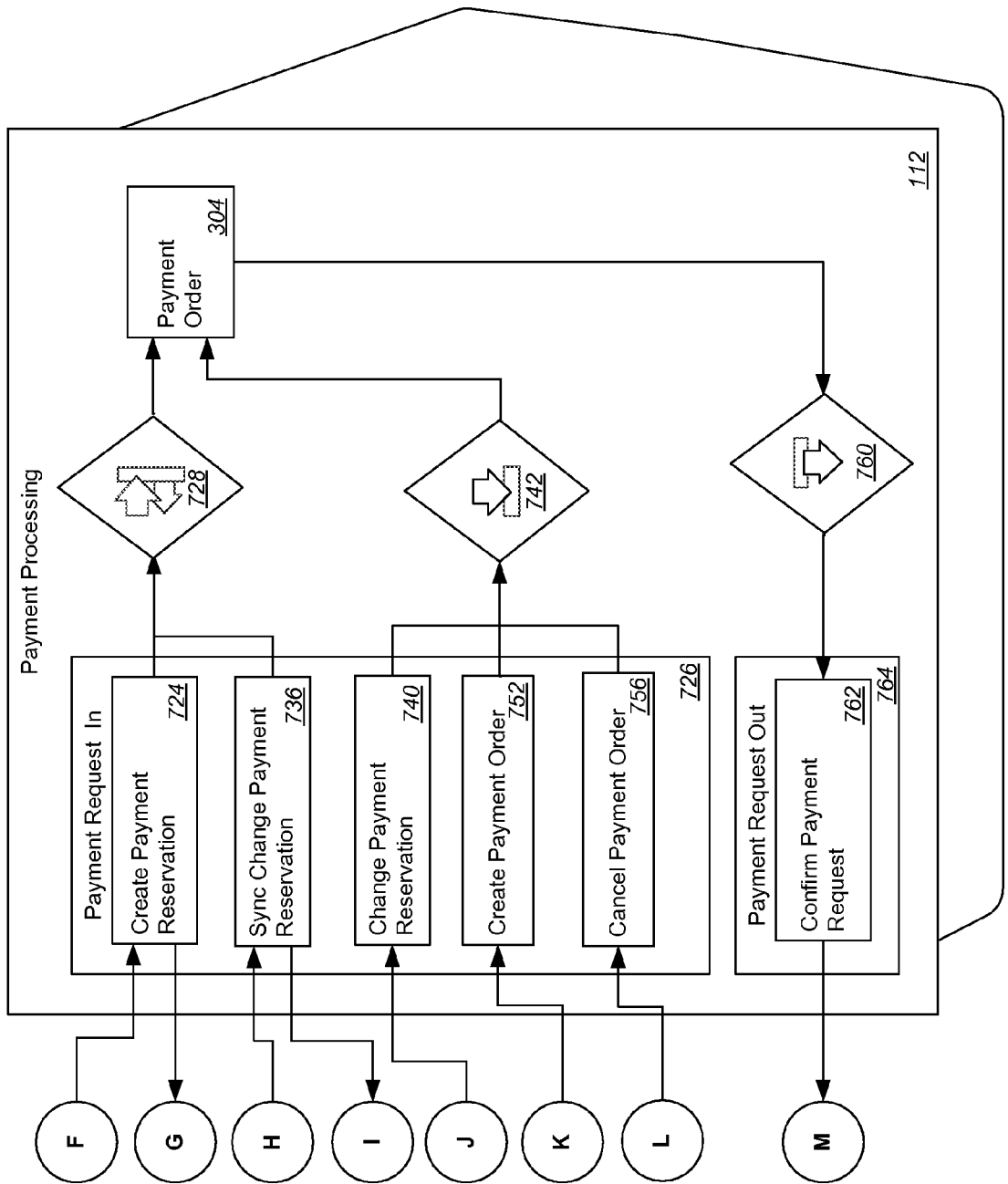

FIGS. 7A and 7B, are block diagrams collectively showing interactions between the Due Item Processing process component 110 and the Payment Processing process component 112 in the architectural design of FIG. 1. The interaction starts when a payment for trade or tax receivables or payables is initiated or cancelled. The Due Item Processing process component 110 can request the creation or the cancellation of a payment order from the Payment Processing process component 112. The Payment Processing process component 112 can then confirm the payment execution to the requestor. Additionally, this interaction allows the Due Item Processing process component 110 to request a reservation or the change of a previously made reservation of cash from the Payment Processing process component 112 within the creation process. The Payment Processing process component 112 can confirm the creation or the change of the reservation immediately.

As shown in FIG. 7A, the Due Item Processing process component 110 includes the Due Payment business object 528, a Product Tax Declaration business object 777, and the Tax Due Payment business object 527. The Due Payment business object 528 represents a payment request or payment confirmation with regard to trade receivables and payables. The Product Tax Declaration business object 777 represents a declaration of the product tax payables/receivables of a company to the responsible tax authority according to the tax declaration arrangement and country specific legal requirements that trigger the payment to the tax authority if required. The Tax Due Payment business object 527 represents a payment request or payment confirmation with regard to trade receivables and payables (e.g., from goods and/or services, etc.).

The Due Payment business object 528 uses a Synchronous Request Payment Reservation from Due Payment to Payment Processing outbound process agent 710. An update in the Due Payment business object 528 can trigger the Synchronous Request Payment Reservation from Due Payment to Payment Processing outbound process agent 710 to invoke one or more operations in a Payment Request Out interface 712. The outbound process agent 710 can invoke a Request Payment Information and Provisional Payment Reservation operation 714, a Request Payment Information and Provisional Payment Reservation Change operation 716, or a Notify of Provisional Payment Reservation Change Cancellation operation 718. The Request Payment Information and Provisional Payment Reservation operation 714 can request payment information with a provisional reservation of money in payment processing. The Request Payment Information and a Provisional Payment Reservation Change operation 716 can request payment information with a change of provisional reservation of money in payment processing. The Notify of Provisional Payment Reservation Change Cancellation operation 718 can register a change of a provisional payment to the last transactional or saved state.

The operation 714 can handle a Payment Order Reservation Confirmation message 720 received by the Due Item Processing process component 110. The operation 714 can also send a Payment Order Reservation Request message 722.

As shown in FIG. 7B, the messages 720, 722 are generated and handled, respectively, by a Create Payment Reservation operation 724, which is included in a Payment Request In interface 726 in the Payment Processing process component 112. The Create Payment Reservation operation 724 can check and determine payment data and create a reservation of payment. After the reservation is created, the operation 724 can confirm the reservation creation to a caller.

The operation 724 uses a Synchronous Maintain Payment Reservation inbound process agent 728 to update the Payment Order business object 304. The inbound process agent 728 can create, change and cancel the Payment Order business object 304 for a reservation request. The Payment Order business object 304 represents an order within a company to make a payment to a business partner at a specified time. A payment order can be a collective order that contains several individual orders.

The Request Payment Information and Provisional Payment Reservation Change operation 716 can send a Payment Order Reservation Change Request message 732. The operation 716 can also handle a Payment Order Reservation Change Confirmation message 734 received by the Due Item Processing process component 110. The messages 732, 734 are handled and sent, respectively, by a Synchronous Change Payment Reservation operation 736, which is included in the Payment Request In interface 726 of the Payment Processing process component 112. The Synchronous Change Payment Reservation operation 736 can synchronously change a reservation of payment and confirm the change to the caller.

After the reservation is changed, the operation 736 can confirm the reservation change to the caller. The operation 736 uses the Synchronous Maintain Payment Reservation inbound process agent 728 to update the Payment Order business object 304.

The Notify of Provisional Payment Reservation Change Cancellation operation 718 can send a Payment Order Reservation Change Cancellation Notification message 738. The message 738 is received by the Payment Processing process component 112 and handled by a Change Payment Reservation operation 740, which is included in the Payment Request In interface 726. For example, the Change Payment Reservation operation 740 can change a reservation of payment and confirm the change to the caller. In this example, the operation 740 triggers a Maintain Payment Order inbound process agent 742 to create or update the Payment Order business object 304.

The Due Payment business object 528 uses a Request Payment front Due Payment to Payment Processing outbound process agent 744 to invoke a Request Payment operation 746 and a Request Payment Cancellation operation 748. Both operations 746 and 748 are part of the Payment Request Out interface 712. The Request Payment operation 746 can send a request for payment to the Payment Processing process component 112. In some cases, the request can confirm a provisional payment made before. The Request Payment Cancellation operation 748 can cancel at least one provisional, requested or ordered payment.

The Request Payment operation 746 can send a Payment Order Request message 750 to the Payment Processing process component 112. The Payment Request In interface 726 of the Payment Processing process component 112 includes a Create Payment Order operation 752 to handle the message 750. The Create Payment Order operation 752 can create a request for payment by triggering the Maintain Payment Order inbound process agent 742 to update the Payment Order business object 304.

The Request Payment Cancellation operation 748 can transmit a Payment Order Cancellation Request message 754 to the Payment Processing process component 112. The Payment Request In interface 726 of the Payment Processing process component 112 includes a Cancel Payment Order operation 756 to handle the message 754. The Cancel Payment Order operation 756 can cancel a request for payment by triggering the Maintain Payment Order inbound process agent 742 to update the Payment Order business object 304.

A creation or update in the Product Tax Declaration business object 777 triggers a Request Payment from Product Tax Declaration to Payment Processing outbound process agent 758 to initiate or cancel a payment from the Product Tax. Declaration business object 777. The outbound process agent 758 can initiate a payment request using the Request Payment operation 746 or can cancel a payment request using the Request Payment Cancellation operation 748.

A creation or update in the Tax Due Payment business object 527 triggers a Request Payment from Tax Due Payment to Payment Processing outbound process agent 776 to initiate or cancel a payment from the Tax Due Payment business object 527. The outbound process agent 776 can initiate or cancel a tax payment via a payment request using the Request Payment operation 746 or can cancel a payment request using the Request Payment Cancellation operation 748.

A creation or update in the Payment Order business object 304 triggers a Confirm Payment Request from Payment Order to Due Item Processing outbound process agent 760. The outbound process agent 760 can confirm a processing status of a payment to the sender of a payment request by invoking a Confirm Payment Request operation 762, which is included in a Payment Request out interface 764. The Confirm Payment Request operation 762 sends a Payment Order Confirmation message 766 to the Due Item Processing process component 110.

As shown in FIG. 7A, Payment Order Confirmation message 766 is handled by a Change Payment based on Payment Request Confirmation operation 768. The Change Payment based on Payment Request Confirmation operation 768 is included in a Payment Request In interface 770. The operation 768 confirms the execution of a payment request or a payment request cancellation. A Change Payment based on Payment Request Confirmation inbound process agent 772 can update a processing status of the Due Payment business object 528, the Product Tax Declaration business object 777, or the Tax Due Payment business object 527 based on the confirmation of a payment request, or a payment request cancellation.

Interactions Between Process Components "Due Item Processing" and "Accounting"

Figure 8:
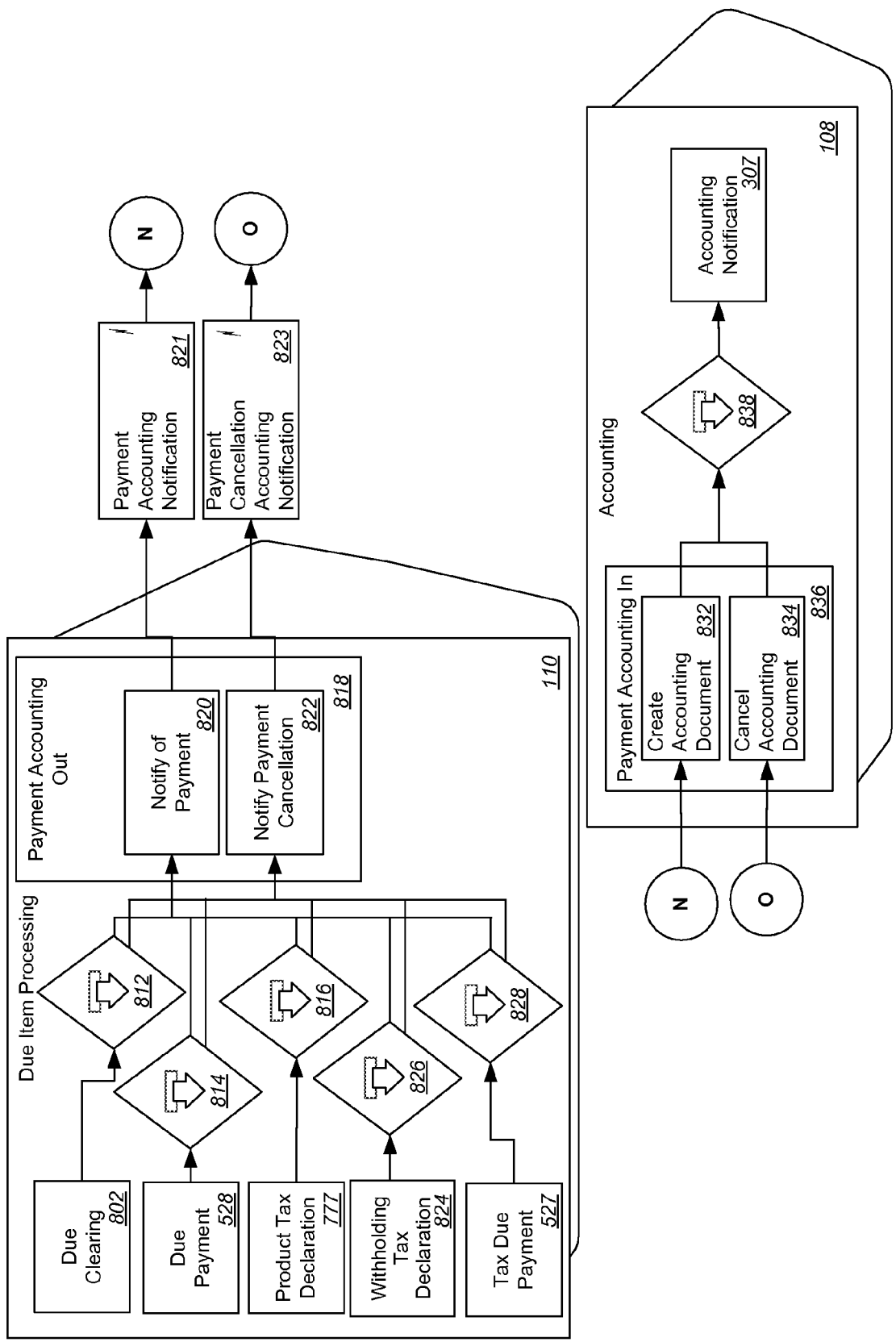
FIG. 8 is a block diagram showing interactions between the Due Item Processing process component and the Accounting process component.

FIG. 8 is a block diagram showing interactions between the Due Item Processing process component 110 and the Accounting process component 108 in the architectural design of FIG. 1. The interaction starts when a payment or clearing for trade or tax receivables or payables is created or cancelled. The Due Item Processing process component 110 notifies the Accounting process component 108 about the creation or cancellation of the payment or clearing.

The Due Item Processing process component 110 includes the Due Clearing business object 802, the Due Payment business object 528, the Product Tax Declaration business object 777, a Withholding Tax Declaration business object 824, and the Tax Due Payment business object 527. The Accounting process component 108 includes the Accounting Notification business object 307. Updates in some or all of the Due Clearing business object 802, the Due Payment business object 528, the Product Tax Declaration business object 777, the Withholding Tax Declaration business object 824 or the Tax Due Payment business object 527 can trigger messages to be sent to the Accounting process component 108.

The Due Clearing business object 802 represents a group of receivables and payables for clearing. The Product Tax Declaration business object 777 represents a declaration of the product tax payables/receivables of a company to the responsible tax authority according to the tax declaration arrangement and country specific legal requirements that trigger the payment to the tax authority if required. The Withholding Tax Declaration business object 824 represents a declaration of withholding tax payables of a company to a tax authority according to the tax declaration arrangement and country specific legal requirements that triggers the payment to the tax authority if required. The Due Payment business object 582 represents a payment request or confirmation with regard to trade receivables and payables. The Tax Due Payment business object 527 represents a payment request or confirmation with regard to tax payables and receivables.

As shown in FIG. 8, an update in the Due Clearing business object 802 uses a Notify of Payment from Due Clearing to Accounting outbound process agent 812. The Notify of Payment from Due Clearing to Accounting outbound process agent 812 invokes a Notify of Payment operation 820 or a Notify Payment Cancellation operation 822. Both operations 820, 822 are included in a Payment Accounting Out interface 818. The Notify of Payment from Due Clearing to Accounting outbound process agent 812 invokes the Notify of Payment operation 820 if the due clearing is released. The Notify of Payment from Due Clearing to Accounting outbound process agent 812 invokes the Notify of Payment Cancellation operation 822 if the due clearing is cancelled. The Notify of Payment operation 820 can notify accounting of payments or clearings of trade and tax receivables or payables. The Notify of Payment operation 820 sends a Payment Accounting Notification message 821 to the Accounting process component 108. The Notify of Payment Cancellation operation 822 can notify accounting of payment or clearing cancellations for trade and tax receivables or payables. The Notify of Payment Cancellation operation 822 sends a Payment Cancellation Accounting Notification message 823 to the Accounting process component 108.

A Payment Accounting In interface 836 includes a Create Accounting Document operation 832 and a Cancel Accounting Document operation 834. The Create Accounting Document operation 832 can receive the Payment Accounting Notification message 821. The Cancel Accounting Document operation 834 receives the Payment Cancellation Accounting Notification message 823. Both operations 832 and 834 use a Maintain Accounting Document based on Payment inbound process agent 838 to update the Accounting Notification business object 307. The Accounting Notification business object 307 represents a notification sent to accounting by an operational component (e.g., Financial Accounting) regarding a business transaction. It represents this operational business transaction in a standardized form for all business transaction documents and can contain the data needed to valuate the business transaction.

The Due Payment business object 528 uses a Notify of Payment from Due Payment to Accounting outbound process agent 814 to send notification to the Accounting process component 108 for inward or outward trade receivables or payables payments. The Notify of Payment from Due Payment to Accounting outbound process agent 814 invokes the Notify of Payment operation 820 or the Notify Payment Cancellation operation 822. The Notify of Payment from Due Payment to Accounting outbound process agent 814 invokes the Notify of Payment operation 820 if a VAT (value added tax) declaration is released. The Notify of Payment from Due Payment to Accounting outbound process agent 814 invokes the Notify of Payment Cancellation operation 822 if the VAT declaration is cancelled.

The Product Tax Declaration business object 777 uses a Notify of Payment from Product Tax Declaration to Accounting outbound process agent 816 to send notification to the Accounting process component 108 for a payment of tax receivables or payables. The Notify of Payment from Product Tax Declaration to Accounting outbound process agent 816 invokes the Notify of Payment operation 820 or the Notify Payment Cancellation operation 822. The Notify of Payment from Product Tax Declaration to Accounting outbound process agent 816 invokes the Notify of Payment operation 820 if a VAT declaration is released. The Notify of Payment from Due Clearing to Accounting outbound process agent 816 invokes the Notify of Payment Cancellation operation 822 if the VAT declaration is cancelled.

The Withholding Tax Declaration business object 824 uses a Notify of Payment from Withholding Tax Declaration to Accounting outbound process agent 826 to send notification to the Accounting process component 108 for a payment of withholding tax receivables and/or payables. The Notify of Payment from Withholding Tax Declaration to Accounting outbound process agent 826 invokes the Notify of Payment operation 820 or the Notify Payment Cancellation operation 822. The Notify of Payment from Withholding Tax Declaration to Accounting outbound process agent 826 invokes the Notify of Payment operation 820 if a VAT declaration is released. The Notify of Payment from Withholding Tax Declaration to Accounting outbound process agent 826 invokes the Notify of Payment Cancellation operation 822 if the VAT declaration is cancelled.

The Tax Due Payment business object 527 uses a Notify of Payment from Tax Due Payment to Accounting outbound process agent 828 to send notification to the Accounting process component 108 of a payment of tax receivables and/or payables. The Notify of Payment from Tax Due Payment to Accounting outbound process agent 828 invokes the Notify of Payment operation 820 or the Notify Payment Cancellation operation 822. The Notify of Payment from Tax Due Payment to Accounting outbound process agent 828 invokes the Notify of Payment operation 820 if a VAT declaration is released. The Notify of Payment from Tax Due Payment to Accounting outbound process agent 828 invokes the Notify of Payment Cancellation operation 822 if the VAT declaration is cancelled.

Interactions Between Process Components "Due Item Processing" and "Processing of Product Tax Declaration at Tax Authority"

Figure 9:
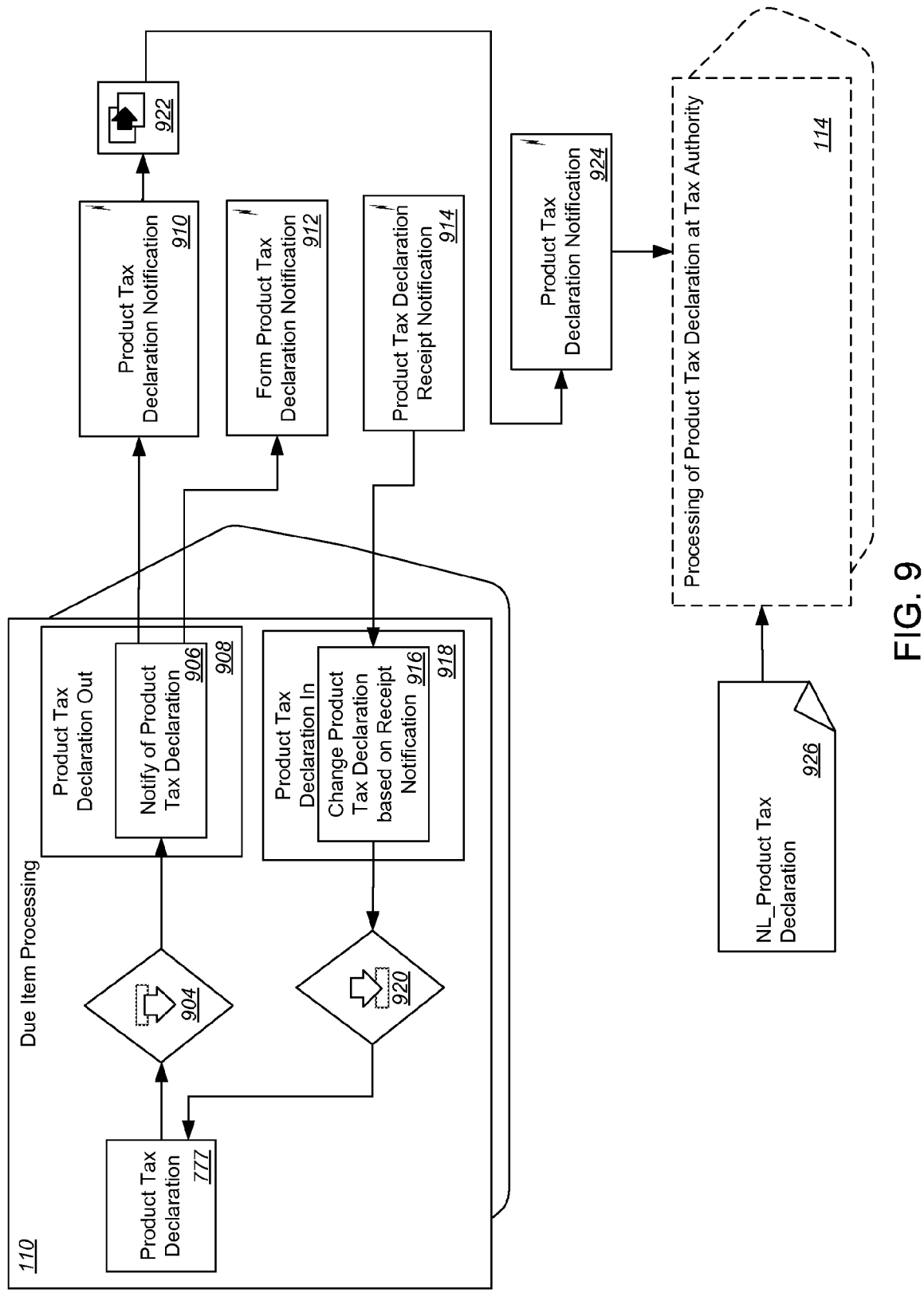
FIG. 9 is a block diagram showing interactions between the Due Item Processing process component and a Processing of Product Tax Declaration at Tax Authority process component.

FIG. 9 is a block diagram showing interactions between the Due Item Processing process component 110 and the Processing of Product Tax Declaration at Tax Authority process component 114 in the architectural design of FIG. 1. The interaction starts when a product tax declaration is created, for example, for the Netherlands.

As shown in FIG. 9, the Due Item Processing process component 110 includes the Product Tax Declaration business object 777. The Product Tax Declaration business object 777 represents a declaration of the product tax payables and receivables of a company to the responsible tax authority according to the tax declaration arrangement and country specific legal requirements that triggers the payment to the tax authority. The Product Tax Declaration business object 777 uses a Notify of Product Tax Declaration to Tax Authority outbound process agent 904 to send notification to the Processing of Product Tax Declaration at Tax Authority process component 114. The process agent 904 invokes the Notify of Product Tax Declaration operation 906. The operation 906 is included in a Product Tax Declaration Out interface 908. The operation 906 generates a form-based or file-based Product Tax Declaration Notification message 910 and a Form Product Tax Declaration Notification message 912. The messages 910, 912 may be sent to the Processing of Product Tax Declaration at Tax Authority process component 114. The message 910 uses a Mapping Entity 922 to transform the file-based message type to a Product Tax Declaration Notification message 924 that can be received by the Processing of Product Tax Declaration at Tax Authority process component 114. In some instances, the Processing of Product Tax Declaration at Tax Authority process component 114 receives information from the Due Item Processing process component 110 using a (Netherlands) NL_Product Tax Declaration communication channel template 926. The communication channel template 926 can define protocols and parameters used for communication with an external party, which can be based in the Netherlands, for example.

A Product Tax Declaration Receipt Notification message 914 is received by the Due Item Processing process component 110, where it is handled by a Change Product Tax Declaration based on Receipt Notification operation 916. The Change Product Tax Declaration based on Receipt Notification operation 916 is included in a Product Tax Declaration In interface 918. The operation 916 uses a Change Product Tax Declaration based on Receipt Notification inbound process agent 920 to update the Product Tax Declaration business object 777 to confirm the receipt of a product tax declaration (e.g., update processing status of Product Tax Declaration business object 777 based on the confirmation from tax authorities for receipt of the tax declaration).

Interactions Between Process Components "Due Item Processing" and "Processing of European Community Sales List Report at Tax Authority"

Figure 10:
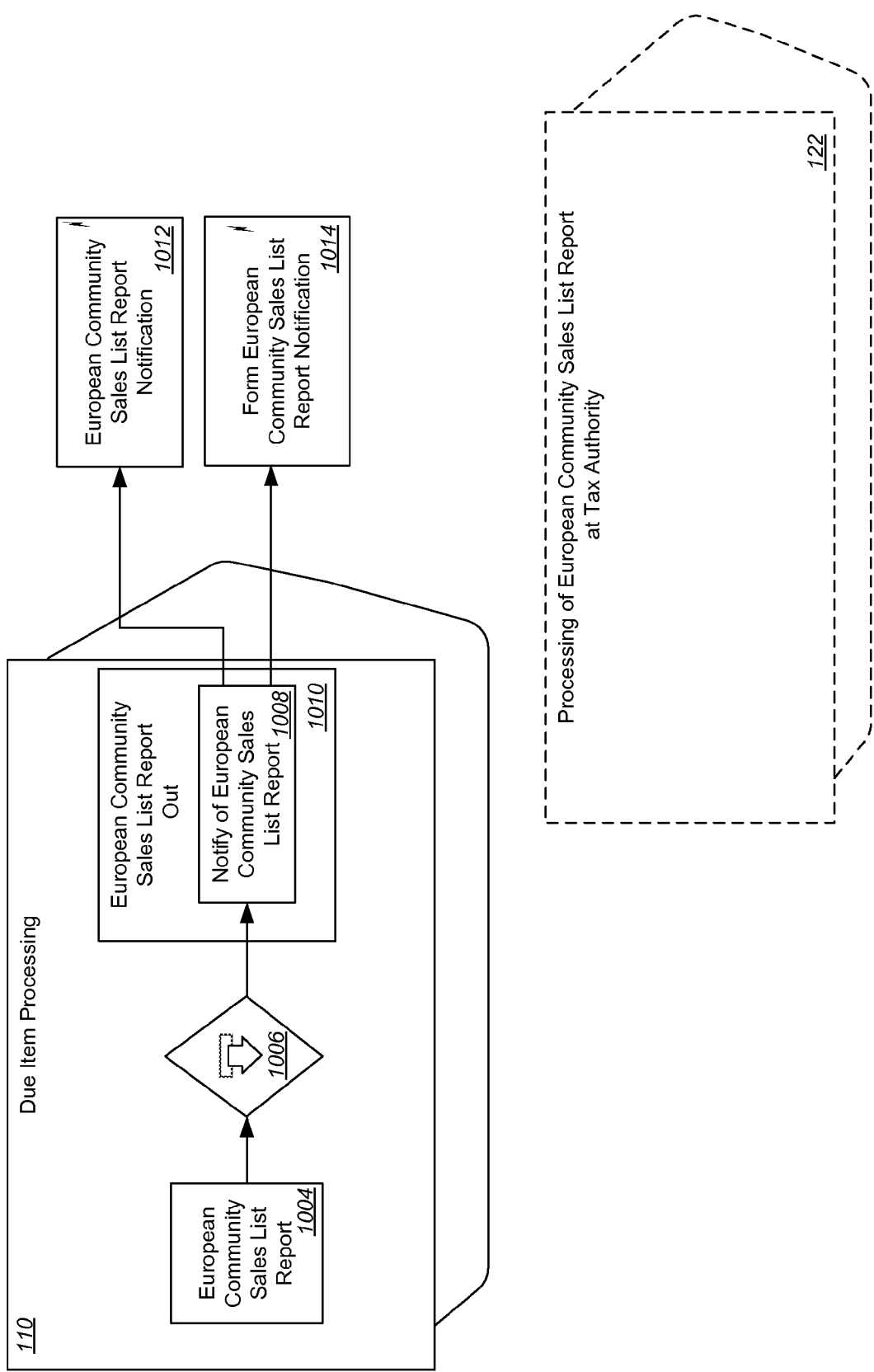
FIG. 10 is a block diagram showing interactions between the Due Item Processing process component and a Processing of European Community Sales List Report at Tax Authority process component.

FIG. 10 is a block diagram showing interactions between the Due Item Processing process component 110 and the Processing of European Community Sales List Report at Tax Authority process component 122 in the architectural design of FIG. 1. The interaction starts when a European Community sales list report is created. The Due Item Processing process component 110 notifies tax authorities about product taxes yet to be declared. The tax authorities confirm the receipt of the European Community sales list report to the Due Item Processing process component 110.

As shown in FIG. 10, the Due Item Processing process component 110 includes a European Community Sales List Report business object 1004. The European Community Sales List Report business object 1004 represents a declaration of the statistical VAT tax payables/receivables of a European Union (EU) member state company to a tax authority according to the tax declaration arrangement and country-specific legal requirements. The European Community Sales List Report business object 1004 uses a Notify of European Community Sales List Report to Tax Authority outbound process agent 1006 to send notification to the Processing of European Community Sales List Report at Tax Authority process component 122. The process agent 1006 invokes a Notify of European Community Sales List Report operation 1008. The operation 1008 is included in a European Community Sales List Report Out interface 1010. The operation 1008 generates a European Community Sales List Report Notification message 1012 and a Form European Community Sales List Report Notification message 1014. The messages 1012, 1014 are sent to the Processing of European Community Sales List Report at Tax Authority process component 122.

Interactions Between Process Components "Payment Processing" and "Payment Processing at Business Partner"

Figure 11:
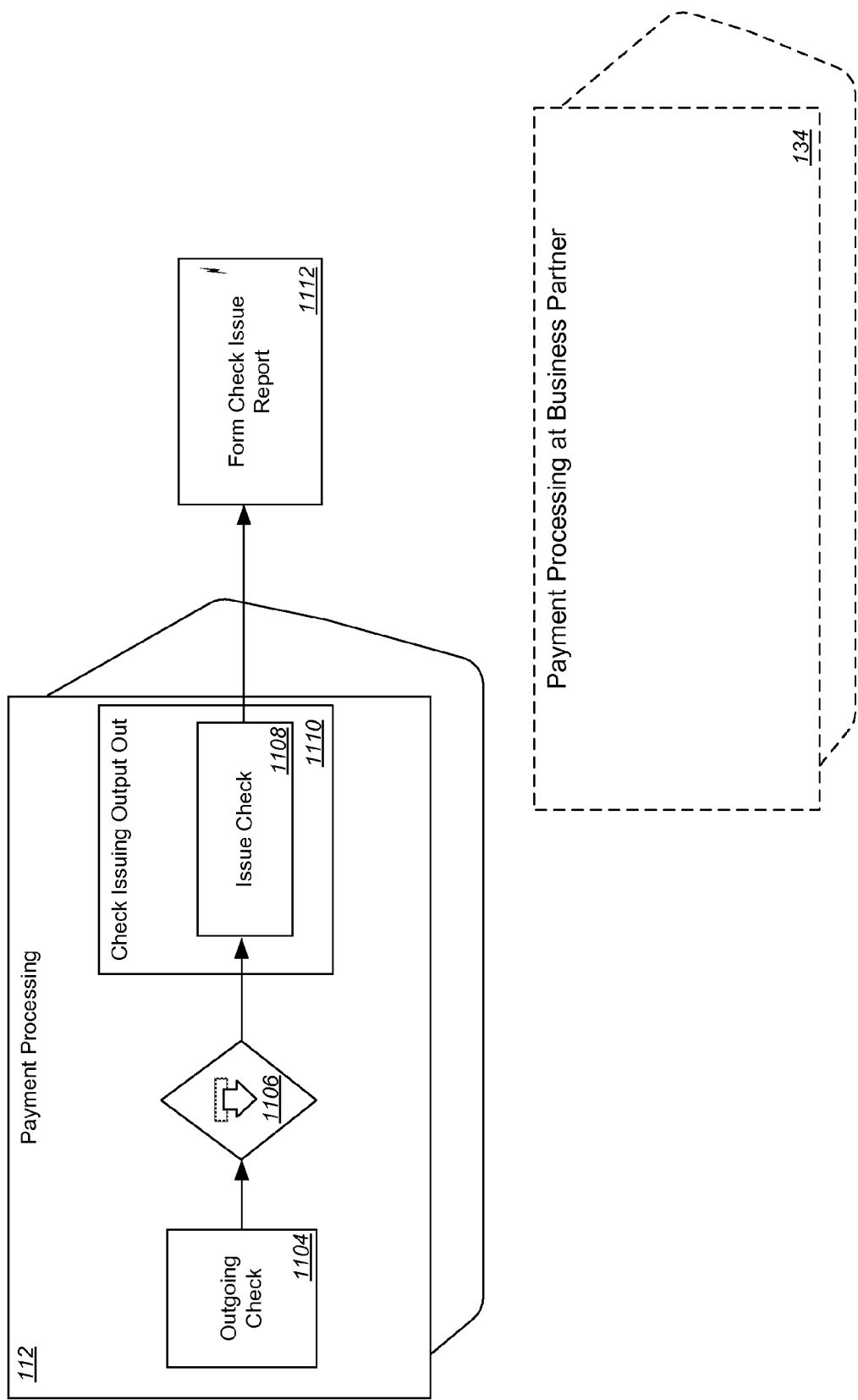
FIG. 11 is a block diagram showing interactions between the Payment Processing process component and a Payment Processing at Business Partner process component.

FIG. 11 is a block diagram showing interactions between the Payment Processing process component 112 and the Payment Processing at Business Partner process component 134 in the architectural design of FIG. 1. The interaction starts when an outgoing check is created from a payment order within the Payment Processing process component 112. The Payment Processing process component 112 prints an outgoing check that will be sent to a business partner.

As shown in FIG. 11, the Payment Processing process component 112 includes an Outgoing Check business object 1104. The Outgoing Check business object 1104 represents a check issued by a company payable to a business partner to fulfill a payment order. The Outgoing Check business object 1104 uses an Issue Check from Outgoing Check to Business Partner outbound process agent 1106 to invoke an Issue Check operation 1108. The operation 1108 requests the issuing a check and is included in a Check Issuing Output Out interface 1110. The operation 1108 generates a Form Check Issue Request message 1112. The message 1112 is sent to the Payment Processing at Business Partner process component 134.

Interactions Between Process Components "Accounting" and "Cash Flow Statement Auditing at Auditor"

Figure 12:
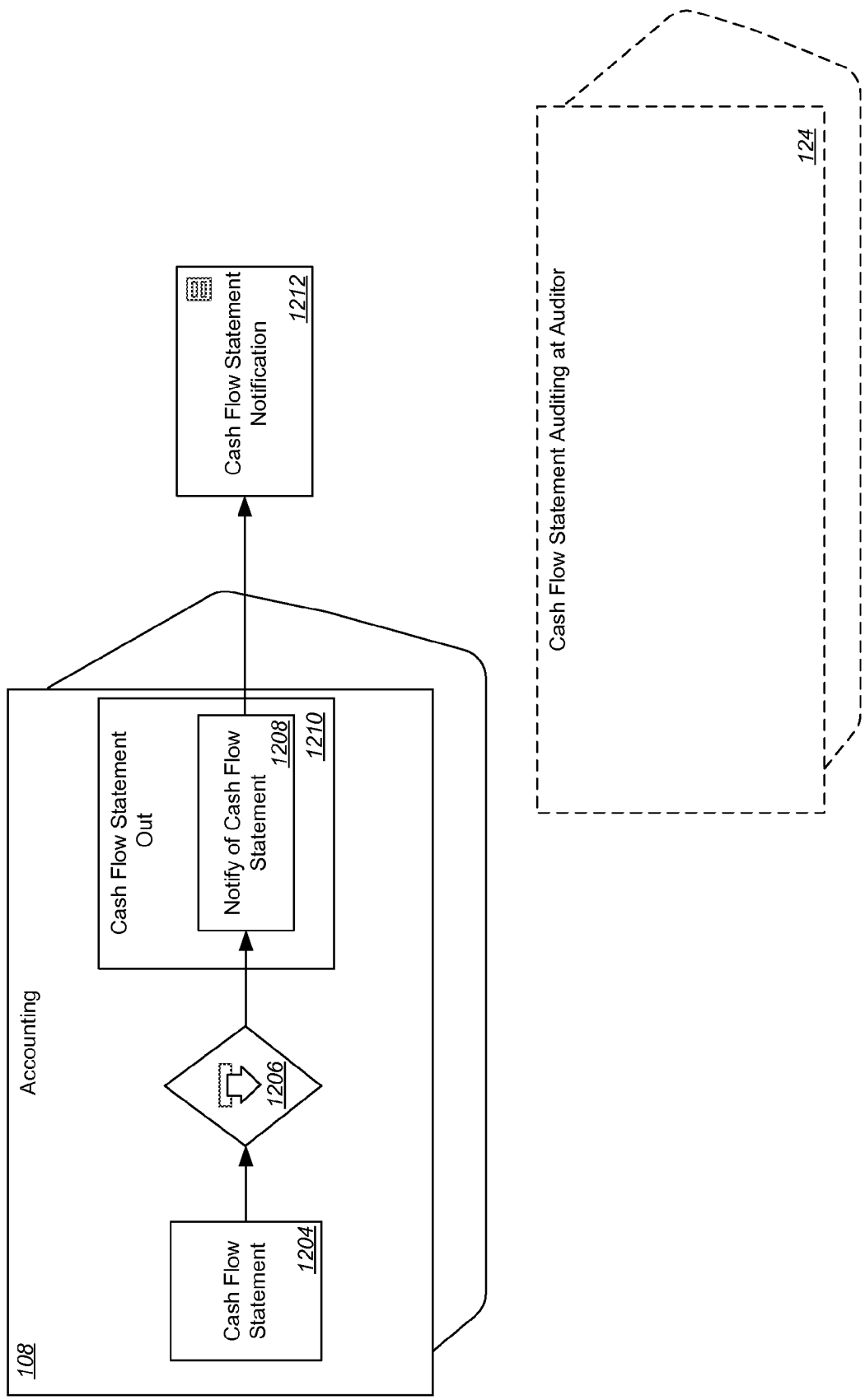
FIG. 12 is a block diagram showing interactions between an Accounting process component and a Cash Flow Statement Auditing at Auditor process component.

FIG. 12 is a block diagram showing interactions between the Accounting process component 108 and the Cash Flow Statement Auditing at Auditor process component 124 in the architectural design of FIG. 1. The interaction starts when a cash flow statement is created.

As shown in FIG. 12, the Accounting process component 108 includes a Cash Flow Statement business object 1204. The Cash Flow Statement business object 1204 represents a statement of changes in cash and cash equivalents during a period, published in a predefined format as stipulated by the legal authorities. The Cash Flow Statement business object 1204 uses a Notify of Cash Flow Statement outbound process agent 1206 to send notification to the Cash Flow Statement Auditing at Auditor process component 124. The process agent 1206 invokes a Notify of Cash Flow Statement operation 1208. The operation 1208 is included in a Cash Flow Statement Out interface 1210. The operation 1208 generates a Cash Flow Statement Notification message 1212. The message 1212 is sent to the Cash Flow Statement Auditing at Auditor process component 124.

Interactions Between Process Components "Accounting" and "Balance Sheet Auditing at Auditor"

Figure 13:
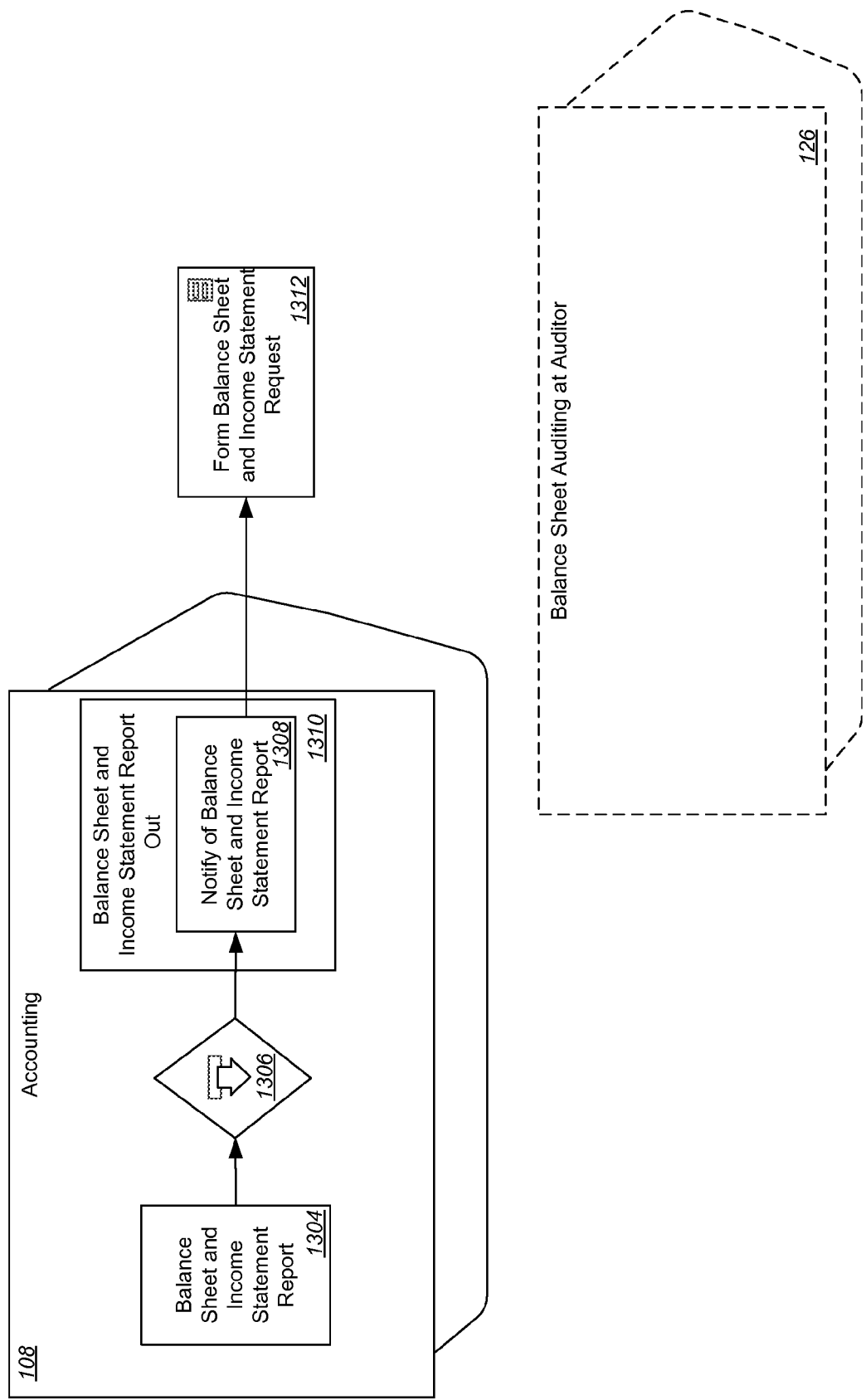
FIG. 13 is a block diagram showing interactions between the Accounting process component and a Balance Sheet Auditing at Auditor process component.

FIG. 13 is a block diagram showing interactions between the Accounting process component 108 and the Balance Sheet Auditing at Auditor process component 126 in the architectural design of FIG. 1. The interaction starts when a balance sheet and income statement report are created. In some instances, legal requirements may requite that accounting be able to send a balance sheet report to an independent auditor.

As shown in FIG. 13, the Accounting process component 108 includes a Balance Sheet and Income Statement Report business object 1304. The Balance Sheet and Income Statement Report business object 1304 represents a report that discloses the book value and net income of a business or other organization at a particular date, often at the end of its fiscal year, in a predefined format as stipulated by the legal authorities. The Balance Sheet and Income Statement Report business object 1304 uses a Notify of Balance Sheet and Income Statement Report outbound process agent 1306 to send notification to the Balance Sheet Auditing at Auditor process component 126. The process agent 1306 invokes a Notify of Balance Sheet and Income Statement Report operation 1308. The operation 1308 is included in a Balance Sheet and Income Statement Out interface 1310. The operation 1308 generates a Form of Balance Sheet and Income Statement Request message 1312. The message 1312 is sent to the Balance Sheet Auditing at Auditor process component 126.

Interactions Between Process Components "Due Item Processing" and "Processing of Withholding Tax Declaration at Tax Authority"

Figure 14:
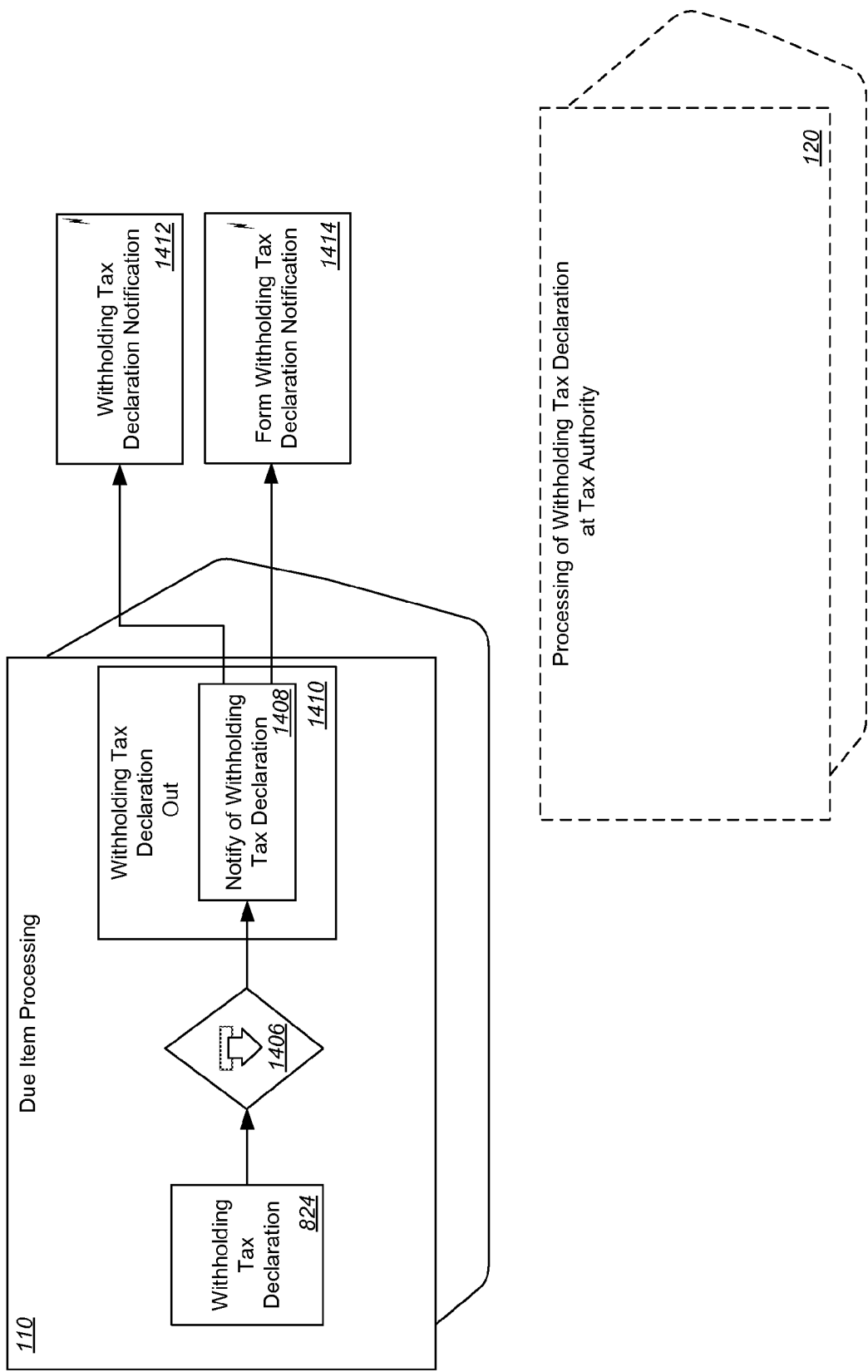
FIG. 14 is a block diagram showing interactions between the Due Item Processing process component and a Processing of Withholding Tax Declaration at Tax Authority process component.

FIG. 14 is a block diagram showing interactions between the Due Item Processing process component 110 and the Processing of Withholding Tax Declaration at Tax Authority process component 120 in the architectural design of FIG. 1. The interaction starts when a withholding tax declaration is created.

As shown in FIG. 14, the Due Item Processing process component 110 includes the Withholding Tax Declaration business object 824. The Withholding Tax Declaration business object 824 represents a declaration of withholding tax payables of company to a tax authority according to the tax declaration arrangement and country-specific legal requirements that trigger the payment to the tax authority. The Withholding Tax Declaration business object 824 uses a Notify of Withholding Tax Declaration at Tax Authority outbound process agent 1406 to send notification to the Processing of Withholding Tax Declaration at Tax Authority process component 120. The process agent 1406 invokes a Notify of Notify of Withholding Tax Declaration operation 1408. The operation 1408 is included in a Withholding Tax Declaration Out interface 1410. The operation 1408 generates a Withholding Tax Declaration Notification message 1412 and a Form Withholding Tax Declaration Notification message 1414. The messages 1412, 1414 are sent to the Processing of Withholding Tax Declaration at Tax Authority process component 120.

Interactions Between Process Components "Accounting" and "Accounting Document Report Auditing at Auditor"

Figure 15:
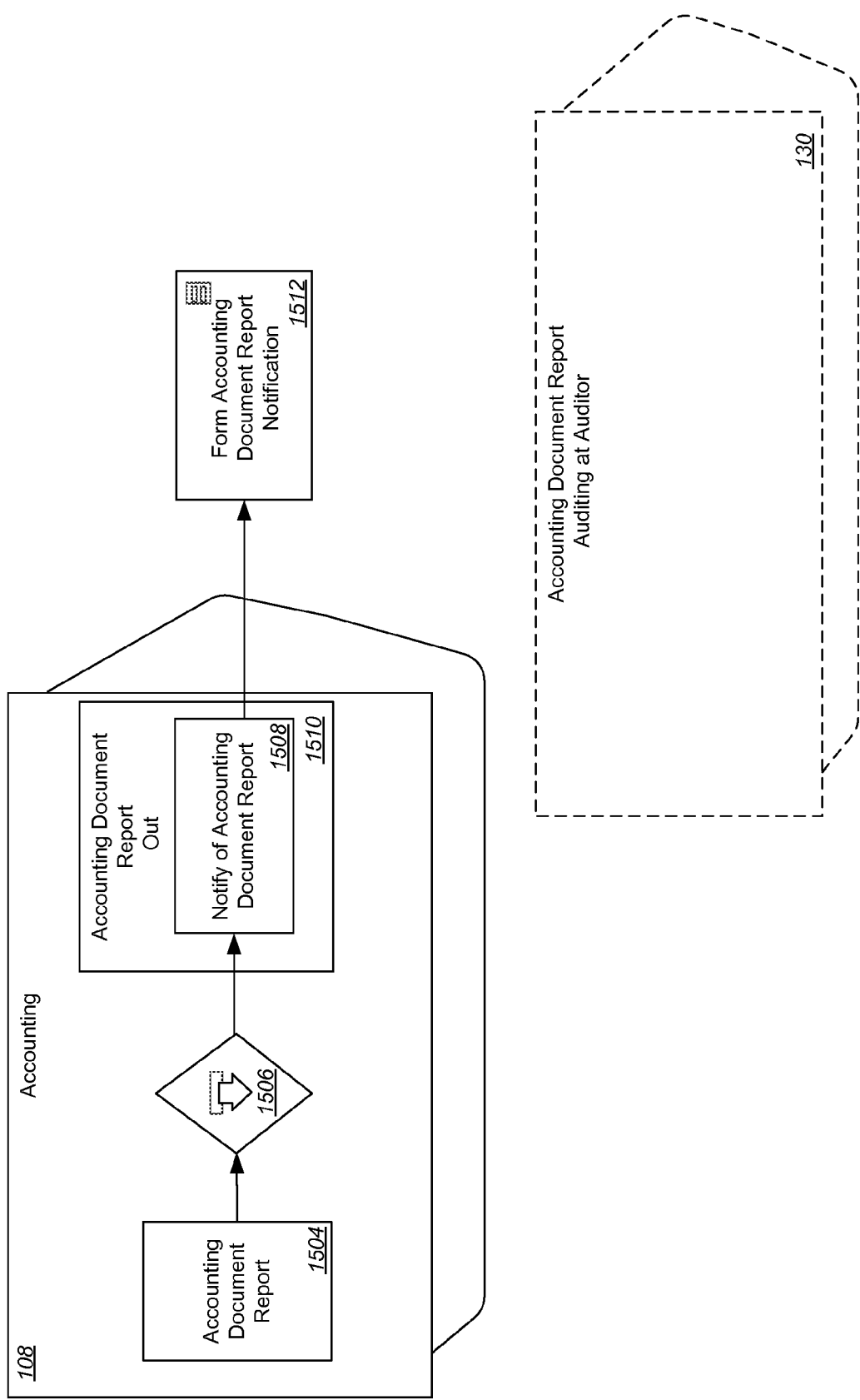
FIG. 15 is a block diagram showing interactions between the Accounting process component and an Accounting Document Report Auditing at Auditor process component.

FIG. 15 is a block diagram showing interactions between the Accounting process component 108 and the Accounting Document Report Auditing at Auditor process component 130 in the architectural design of FIG. 1. The interaction starts when an accounting document report is created. In some instances, a country or tax authority may legally require that account be able to send an accounting document report to an independent auditor.

As shown in FIG. 15, the Accounting process component 108 includes an Accounting Document Report business object 1504. The Accounting Document Report business object 1504 represents a record of accounting documents grouped by period and formatted as stipulated by the legal authorities. The Accounting Document Report business object 1504 uses a Notify of Accounting Document Report outbound process agent 1506 to send notification to the Accounting Document Report Auditing at Auditor process component 130. The process agent 1506 invokes a Notify of Accounting Document Report operation 1508. The operation 1508 is included in an Accounting Document Report Out interface 1510. The operation 1508 generates a Form Accounting Document Report message 1512. The message 1512 is sent to the Accounting Document Report Auditing at Auditor process component 130.

Interactions Between Process Components "Accounting" and "Account Balance Report Auditing at Auditor"

Figure 16:
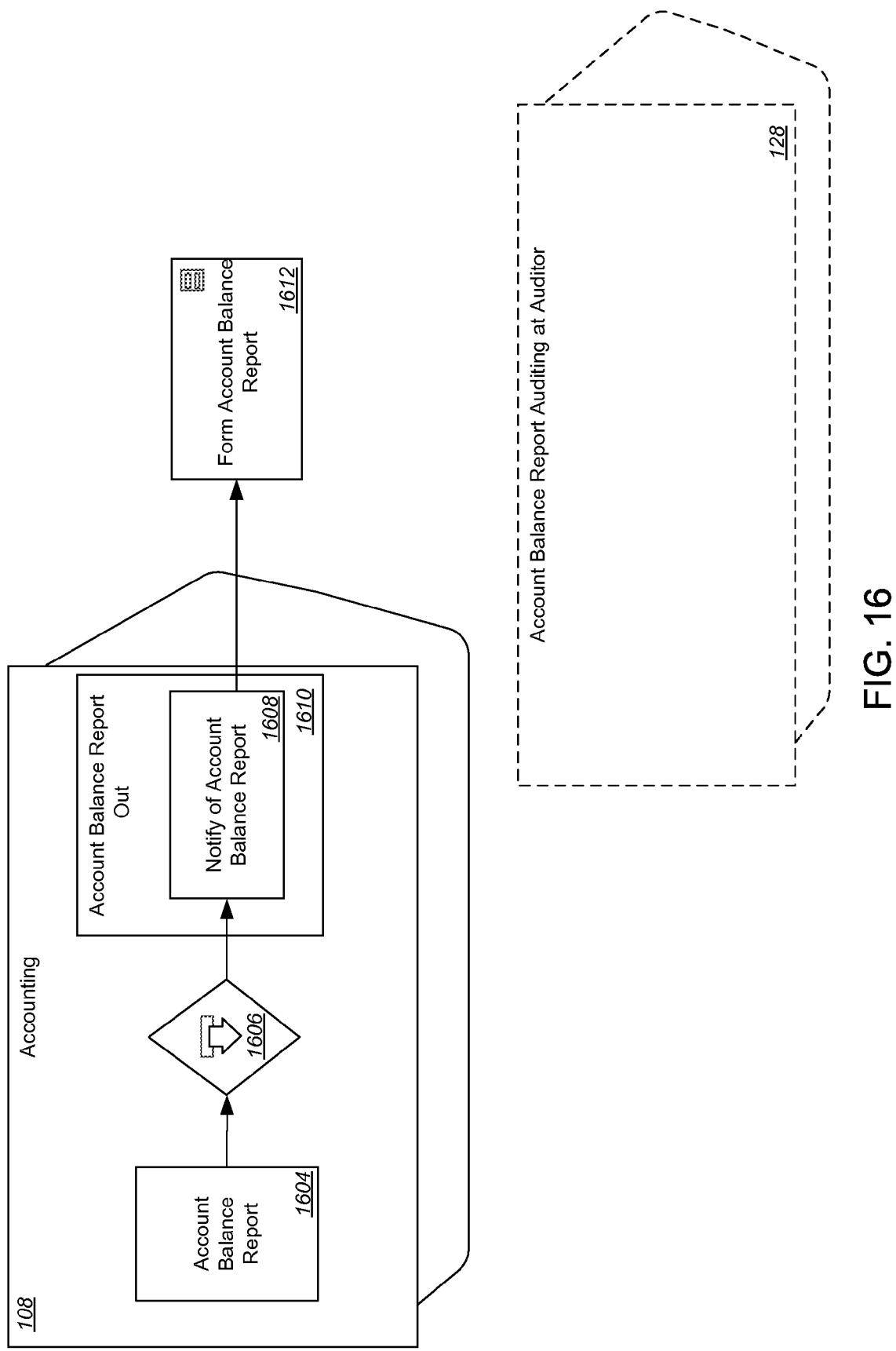
FIG. 16 is a block diagram showing interactions between the Accounting process component and an Account Balance Report Auditing at Auditor process component.

FIG. 16 is a block diagram showing interactions between the Accounting process component 108 and the Account Balance Report Auditing at Auditor process component 128 in the architectural design of FIG. 1. The interaction starts when an account balance report is created. In some instances, a country or tax authority may legally require that account be able to send an accounting document report to an independent auditor.

As shown in FIG. 16, the Accounting process component 108 includes an Account Balance Report business object 1604. The Account Balance Report business object 1604 represents a record of general ledger account balances at the end of an accounting period, often at the end of a company's fiscal year, in a predefined format as stipulated by the legal authorities. The Account Balance Report business object 1604 uses a Notify of Account Balance Report outbound process agent 1606 to send notification to the Account Balance Report Auditing at Auditor process component 128. The process agent 1606 invokes a Notify of Account Balance Report operation 1608. The operation 1608 is included in an Account Balance Report Out interface 1610. The operation 1608 generates a Form Account Balance Report message 1612. The message 1612 is sent to the Account Balance Report Auditing at Auditor process component 128.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory Feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the present disclosure or of what may be claimed, but rather as an exemplification of preferred embodiments of the present disclosure. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer program product comprising application software encoded on a non-transitory, tangible machine-readable information carrier, the application software being structured as process components interacting with each other through service interfaces, the software comprising:

a plurality of process components, each of the process components comprising a modular and application-independent package of reusable software implementing a respective and distinct business process, the business process comprising functionality exposed by the process component via at least one service interface, the plurality of process components including:

an accounting process component that records relevant business transactions for valuation and profitability analysis;

a due item processing process component that handles the collection, management, and monitoring of trade receivables or payables and corresponding sales tax or withholding tax; and a payment processing process component that handles the processing and management of all payments; and a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the passing of messages between an inbound and an outbound operation defining a message-based pair-wise interaction between the respective process components of the respective operations, the pair-wise interactions between pairs of the process components including interactions between:

the payment processing process component and the accounting process component, where the pair-wise interaction between the payment processing process component and the accounting process component includes the transmission of:

a payment accounting notification message from the payment processing process component to the accounting process component, the payment accounting notification message notifying the accounting process component of creation of a payment ordered, received, or allocated; and a payment cancellation accounting notification message from the payment processing process component to the accounting process component, the payment cancellation accounting notification message notifying the accounting process component of cancellation of a payment ordered, received, or allocated;

the payment processing process component and the due item processing process component, where the pairwise interaction between the payment processing process component and the due item processing process component includes the transmission of:

a clearing request message from the payment processing process component to the due item processing process component, the clearing request message requesting the clearing of payments within the due item processing process component;

a clearing cancellation request message from the payment processing process component to the due item processing process component, the clearing cancellation request message requesting cancellation of a previously sent clearing request; and a clearing confirmation message from the due item processing process component to the payment processing process component, the clearing confirmation message confirming the execution or rejection of a sent clearing request;

the due item processing process component and the payment processing process component, where the pairwise interaction between the due item processing process component and the payment processing process component includes the transmission of:

a payment order reservation request message from the due item processing process component to the accounting process component, the payment order reservation request message requesting payment information with a provisional reservation of money in payment processing; and a payment order reservation confirmation message from the payment processing process component to the due item processing process component, the payment order reservation confirmation message confirming requested payment information with a provisional reservation of money in payment processing;

the due item processing process component and the accounting process component where the pair-wise interaction between the due item processing process component and the accounting process component includes the transmission of:
  a payment accounting notification message from the due item processing process component to the accounting process component the payment accounting notification notifying accounting of payments or clearings for trade and tax receivables or payables; and
  a payment cancellation accounting notification message from the due item processing process component to the accounting process component the payment cancellation accounting notification message notifying accounting of payment or clearing cancellations for trade and tax receivables or payables;
a bank statement creation at bank process component and the payment processing process component;
the payment processing process component and a payment order at house bank process component;
the due item processing process component and a processing product tax declaration at tax authority process component;
the due item processing process component and a processing of European community sales list report at tax authority process component;
the payment processing process component and a payment processing at business partner process component;
the accounting process component and a cash flow statement auditing at auditor process component;
the accounting process component and a balance sheet auditing at auditor process component;
the due item processing process component and a processing of withholding tax declaration at tax authority process component;
the accounting process component and an accounting document report auditing at auditor process component; and the accounting process component and an account balance report auditing at auditor process component.

2. The computer program product of claim 1, wherein:
each of the plurality of process components is assigned to exactly one deployment unit among multiple deployment units, and each deployment unit is deployable on a separate computer hardware platform independent of every other deployment unit; and all interaction between a process component in one deployment unit and any other process component in any other deployment unit takes place through the respective service interfaces of the two process components.

3. The computer program product of claim 1, wherein the deployment units comprise:
a financial accounting deployment unit that includes the accounting process component;
a due item management deployment unit that includes the due item processing process component; and
a payment deployment unit that includes the payment processing process component.

4. The computer program product of claim 1, wherein:
each of the process components includes at least one business object; and
none of the business objects of any one of the process components interacts directly with any of the business objects included in any of the other process components.

5. The computer program product of claim 4, wherein the business objects comprise a business process object.

6. The computer program product of claim 4, wherein none of the business objects included in any one of the process components is included in any of the other process components.

7. The computer program product of claim 1, further comprising a plurality of process agents, each process agent being either an inbound process agent or an outbound process agent, the inbound process agent being operable to receive a message from the inbound operation, the outbound process agent being operable to cause the outbound operation to send a message and each process agent being associated with exactly one process component.

8. The computer program product of claim 7, wherein the inbound process agents comprise a first inbound process agent operable to start the execution of a business process step requested in a first inbound message by creating or updating at least one business object instance.

9. The computer program product of claim 7, wherein the outbound process agents comprise a first asynchronous outbound process agent that is called after a business object that is associated with the first outbound process agent changes.

10. The computer program product of claim 1, wherein the operations comprise synchronous and asynchronous operations.

11. A system, comprising:
a computer system comprising at least one hardware platform configured with a computer software application; the computer software application being structured as a plurality of process components interacting with each other through service interfaces:
each of the process components comprising a modular and application-independent package of reusable software implementing a respective and distinct business process, the business process comprising functionality exposed by the process component via at least one service interface, the plurality of process components including:
  an accounting process component that records relevant business transactions for valuation and profitability analysis;
  a due item processing process component that handles the collection, management, and monitoring of trade receivables or payables and corresponding sales tax or withholding tax; and
  a payment processing process component that handles the processing and management of all payments; and
a plurality of service interfaces, each service internee associated with exactly one process component and comprising at least one operation, each operation being implemented for a respective exactly one process component, the operations comprising inbound and outbound operations, the outbound operation for a first process component being operable to send a message to a second process component of the plurality of process components, the second process component having an inbound operation for receiving the message, the passing of messages between an inbound and an outbound operation defining a message-based pair-wise interaction between the respective process components of the respective operations, the pair-wise interactions between pairs of the process components including interactions between:
  the payment processing process component and the accounting process component, where the pair-wise interaction between the payment processing process component and the accounting process component includes the transmission of:

a payment accounting notification message from the payment processing process component to the accounting process component, the payment accounting notification message notifying the accounting process component of creation of a payment ordered, received, or allocated; and a payment cancellation accounting notification message from the payment processing process component to the accounting process component, the payment cancellation accounting notification message notifying the accounting process component of cancellation of a payment ordered, received, or allocated;

the payment processing process component and the due item processing process component, where the pairwise interaction between the payment processing process component and the due item processing process component includes the transmission of:

a clearing request message from the payment processing process component to the due item processing process component, the clearing request message requesting the clearing of payments within the due item processing process component;

a clearing cancellation request message from the payment processing process component to the due item processing process component, the clearing cancellation request message requesting cancellation of a previously sent clearing request; and a clearing confirmation message from the due item processing process component to the payment processing process component, the clearing confirmation message confirming the execution or rejection of a sent clearing request;

the due item processing process component and the payment processing process component, where the pairwise interaction between the due item processing process component and the payment processing process component includes the transmission of:

a payment order reservation request message from the due item processing process component to the accounting process component, the payment order reservation request message requesting payment information with a provisional reservation of money in payment processing; and a payment order reservation confirmation message from the payment processing process component to the due item processing process component, the payment order reservation confirmation message confirming requested payment information with a provisional reservation of money in payment processing;

the due item processing process component and the accounting process component where the pair-wise interaction between the due item processing process component and the accounting process component includes the transmission of:

a payment accounting notification message from the due item processing process component to the accounting process component, the payment accounting notification notifying accounting of payments or clearings for trade and tax receivables or payables; and a payment cancellation accounting notification message from the due item processing process component to the accounting process component, the payment cancellation accounting notification message notifying accounting of payment or clearing cancellations for trade and tax receivables or payables;

a bank statement creation at bank process component and the payment processing process component;

the payment processing process component and a payment order at house bank process component;

the due item processing process component and a processing product tax declaration at tax authority process component;

the due item processing process component and a processing of European community sales list report at tax authority process component;

the payment processing process component and a payment processing at business partner process component;

the accounting process component and a cash flow statement auditing at auditor process component;

the accounting process component and a balance sheet auditing at auditor process component;

the due item processing process component and a processing of withholding tax declaration at tax authority process component;

the accounting process component and an accounting document report auditing at auditor process component; and the accounting process component and an account balance report auditing at auditor process component.

12. The system of claim 11, wherein:

each of the process components includes at least one business object; and none of the business objects of any one of the process components interacts directly with any of the business objects included in any of the other process components.

13. The system of claim 11, wherein none of the business objects included in any one of the process components is included in any of the other process components.

14. The system of claim 11, further comprising a plurality of process agents, each process agent being either an inbound process agent or an outbound process agent, the inbound process agent being operable to receive a message from the inbound operation, the outbound process agent being operable to cause the outbound operation to send a message and each process agent being associated with exactly one process component.

15. The system of claim 11, the system comprising multiple hardware platforms, wherein:

the accounting process component is deployed on a first hardware platform;

the due item processing process component is deployed on a second hardware platform; and the payment processing process component is deployed on a third hardware platform.

16. The system of claim 15 wherein each of the first through the third hardware platforms is distinct and separate from each other.

17. A computer-implemented method for developing a computer software application, the method comprising the following steps performed by at least one processor:

obtaining, in a programmable computer system having at least one processor, a storage medium, and an interface, digital data representing an architectural design for a set of processes implementing an end-to-end application process, the design specifying a process component for each process in the set of processes, each of the process components comprising a modular and application-independent package of reusable software implementing a respective and distinct process, the design further specifying a set of process component interactions based on messages transmitted between two or more process components, wherein:

the specified process components include:
- an accounting process component that records relevant business transactions for valuation and profitability analysis;
- a due item processing process component that handles the collection, management, and monitoring of trade receivables or payables and corresponding sales tax or withholding tax; and
- a payment processing process component that handles the processing and management of all payments; and the process component interactions include interactions between:
- the payment processing process component and the accounting process component, where the interaction between the payment processing process component and the accounting process component includes the transmission of:
  - a payment accounting notification message from the payment processing process component to the accounting process component, the payment accounting notification message notifying the accounting process component of creation of a payment ordered, received, or allocated; and
  - a payment cancellation accounting notification message from the payment processing process component to the accounting process component, the payment cancellation accounting notification message notifying the accounting process component of cancellation of a payment ordered, received, or allocated;
- the payment processing process component and the due item processing process component, where the interaction between the payment processing process component and the due item processing process component includes the transmission of:
  - a clearing request message from the payment processing process component to the due item processing process component, the clearing request message requesting the clearing of payments within the due item processing process component;
  - a clearing cancellation request message from the payment processing process component to the due item processing process component, the clearing cancellation request message requesting cancellation of a previously sent clearing request; and
  - a clearing confirmation message from the due item processing process component to the payment processing process component, the clearing confirmation message confirming the execution or rejection of a sent clearing request;
- the due item processing process component and the payment processing process component, where the interaction between the due item processing process component and the payment processing process component includes the transmission of:
  - a payment order reservation request message from the due item processing process component to the accounting process component, the payment order reservation request message requesting payment information with a provisional reservation of money in payment processing; and
  - a payment order reservation confirmation message from the payment processing process component to the due item processing process component, the payment order reservation confirmation message confirming a requested payment information with a provisional reservation of money in payment processing;
- the due item processing process component and the accounting process component, where the interaction between the due item processing process component and the accounting process component includes the transmission of:
- a payment accounting notification message from the due item processing process component to the accounting process component the payment accounting notification notifying accounting of payments or clearings for trade and tax receivables or payables; and a payment cancellation accounting notification message from the due item processing process component to the accounting process component the payment cancellation accounting notification message notifying accounting of payment or clearing cancellations for trade and tax receivables or payables;
- a bank statement creation at bank process component and the payment processing process component;
- the payment processing process component and a payment order at house bank process component;
- the due item processing process component and a processing product tax declaration at tax authority process component;
- the due item processing process component and a processing of European community sales list report at tax authority process component; the payment processing process component and a payment processing at business partner process component;
- the accounting process component and a cash flow statement auditing at auditor process component;
- the accounting process component and a balance sheet auditing at auditor process component;
- the due item processing process component and a processing of withholding tax declaration at tax authority process component;
- the accounting process component and an accounting document report auditing at auditor process component; and the accounting process component and an account balance report auditing at auditor process component; and generating, using the at least one processor on the computer system, a computer software application to perform the set of processes based on the obtained design including the specified process components and the specified process component interactions.

18. The method of claim 17, wherein each process in the set of processes is a business process transforming a defined business input into a defined business outcome.

19. The method of claim 17, wherein obtaining digital data representing the architectural design further comprises editing the design before generating the computer software application.

* * * * *